United States Patent
Singh et al.

(10) Patent No.: US 8,396,884 B2
(45) Date of Patent: **\*Mar. 12, 2013**

(54) GRAPH QUERYING, GRAPH MOTIF MINING AND THE DISCOVERY OF CLUSTERS

(75) Inventors: Ambuj Kumar Singh, Santa Barbara, CA (US); Huahai He, San Jose, CA (US); Sayan Ranu, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,452

(22) Filed: Mar. 28, 2011

(65) Prior Publication Data
US 2011/0173189 A1    Jul. 14, 2011

Related U.S. Application Data

(63) Continuation of application No. 11/711,326, filed on Feb. 27, 2007, now Pat. No. 7,933,915.

(60) Provisional application No. 60/777,037, filed on Feb. 27, 2006.

(51) Int. Cl.
*G06F 17/30* (2006.01)
(52) U.S. Cl. .......... 707/760; 707/798; 707/E17.03
(58) Field of Classification Search .......... None
See application file for complete search history.

(56) References Cited

PUBLICATIONS

Lee et al. "STRG-Index: Spatio-Temporal Region Graph indexing for Large Video Databases, SIGMOD 2005 Jun. 14-16, 2005" pp. 718-729.*
Sun et al. "Relevance Search and Anomaly Detection in Bipartite Graphs, SIGKDD Explorations, vol. 7, Issue 2, pp. 48-55".*
Yan et al. "CloseGraph: Mining Closed Frequent Graph Patterns SIGKDD 2003 Aug. 2003 pp. 286-295".*
Weston et al. "Protein Ranking: From Local to Global Structure in the Protein Similarity Network" PNAS 27 vol. 101, No. 17, Apr. 27, 2004 pp. 6559-6563.*
S. Berretti, A. D. Bimbo, and E. Vicario. Efficient matching and indexing of graph models in content-based retrieval. In IEEE Trans. on Pattern Analysis and Machine Intelligence, vol. 23, 2001.
E. Rahm and P. Bernstein. A survey of approaches to automatic schema matching. VLDB J. 10(4): 334-350 (2001).
J. Lee, J. Oh, and S. Hwang. STRG-index: Spatio-temporal region graph indexing for large video databases. In SIGMOD Conference, 2005.
KEGG. http://www.genome.ad.jp/kegg/.
National Cancer Institute. http://dtp.nci.nih.gov/.
H. Berman et al. The protein data bank. Nucleic Acids Research, (28):235-242, 2000.
S. White and P. Smyth. Algorithms for estimating relative importance in networks. In Proc. SIGKDD, 2003.
Gene Ontology. http://www.geneontology.org/.
MeSH. http://www.nlm.nih.gov/mesh/.
D. Shasha, J. T. L. Wang, and R. Giugno. Algorithmics and applications of tree and graph searching. 2002.
X. Yan, P. S. Yu, and J. Han. Graph indexing: A frequent structure-based approach. In SIGMOD Conference, 2004.
X. Yan, P. S. Yu, and J. Han. Substructure similarity search in graph databases. In SIGMOD Conference, 2005.
P. Ciaccia, M. Patella, and P. Zezula. M-tree: An efficient access method for similarity search in metric spaces. In Proc. of VLDB, 1997.
A. Guttman. R-trees: A dynamic index structure for spatial searching. In Proc. of SIGMOD, 1984.

(Continued)

*Primary Examiner* — Anteneh Girma
(74) *Attorney, Agent, or Firm* — Gates & Cooper LLP

(57) ABSTRACT

A method for analyzing, querying, and mining graph databases using subgraph and similarity querying. An index structure, known as a closure tree, is defined for topological summarization of a set of graphs. In addition, a significance model is created in which the graphs are transformed into histograms of primitive components. Finally, connected substructures or clusters, comprising paths or trees, are detected in networks found in the graph databases using a random walk technique and a repeated random walk technique.

10 Claims, 17 Drawing Sheets

PUBLICATIONS

N. Beckmann, H.-P. Kriegel, R. Schneider, and B. Seeger. The Rtree: An efficient and robust access method for points and rectangles. In SIGMOD Conference, 1990.

J. Hopcroft and R. Karp. An $n^{5/2}$ algorithm for maximum matchings in bipartite graphs. SIAM J. Computing, 1973.

H. W. Kuhn. The hungarian method for the assignment problem. Naval Research Logistics Quarterly, 1955.

C. H. Papadimitriou and K. Steiglit. Combinatorial optimization: algorithms and complexity, pp. 247-255. 1982.

M. Heymans and A. K. Singh. Deriving phylogenetic trees from the similarity analysis of metabolic pathways. Bioinformatics, 19, 2003.

C. Faloutsos and K.-I. Lin. Fastmap: A fast algorithm for indexing, data-mining and visualization of traditional and multimedia datasets. In SIGMOD Conference, 1995.

J. R. Ullmann. An algorithm for subgraph isomorphism. Journal of the ACM, 1976.

G. R. Hjaltason and H. Samet. Ranking in spatial databases. In Proc. 4th Int. Symposium on Large Spatial Databases (SSD'95), pp. 83-95, 1995.

T. Seidl and H.-P. Kriegel. Optimal multi-step k-nearest neighbor search. In SIGMOD Conference, 1998.

M. Kuramochi and G. Karypis. Frequent subgraph discovery. In Proc. of ICDM, 2001.

J. Hu, X. Shen, Y. Shao, C. Bystroff, and M. J. Zaki. Mining protein contact maps. In BIOKDD, 2002.

R. Sharan, S. Suthram, R. M. Kelley, T. Kuhn, S. McCuine, P. Uetz, T. Sittler, R. M. Karp, and T. Ideker. Conserved patterns of protein interaction in multiple species. In Proc Natl Acad Sci, 2005.

Kramer, L. D. Raedt, and C. Helma. Molecular feature mining in HIV data. In KDD, 2001.

A. Inokuchi, T. Washio, and H. Motoda. An apriori-based algorithm for mining frequent substructures from graph data. In Principles of Data Mining and Knowledge Discovery, pp. 13-23, 2000.

X. Yan and J. Han. gSpan: Graph-based substructure pattern mining. In ICDM, 2002.

J. Huan, W. Wang, and J. Prins. Efficient mining of frequent subgraph in the presence of isomorphism. In ICDM, 2003.

J. Huan, W. Wang, J. Prins, and J. Yang. SPIN: Mining maximal frequent subgraphs from graph databases. In KDD, 2004.

R. Milo, S. Shen-Orr, S. Itzkovitz, N. Kashtan, D. Chklovskii, and U. Alon. Network motifs: Simple building blocks of complex networks. Science, Oct. 2002.

Huahai He and Ambuj K. Singh. GraphRank: Statistical modeling and mining of significant subgraphs in the feature space. Technical report, department of computer science, University of California at Santa Barbara, 2006.

D. J. Aldous. Random walks on finite groups and rapidly mixing Markov chains. In Seminaire de Probabilites XVII, pp. 243-297. 1983. Lecture Notes in Math. 986.

V. Arnau, S. Mars, and I. Marin. Iterative cluster analysis of protein interaction data. Bioinformatics, 21(3):364-378, 2005.

S. Asthana, O. D. King, F. D. Gibbons, and F. P. Roth. Predicting protein complex membership using probabilistic network reliability. Genome Research, 14:1170-1175, May 2004.

G. D. Bader and C. W. V. Hogue. An automated method for finding molecular complexes in large protein interaction networks. BMC Bioinformatics, 4(2), 2003.

J. S. Bader. Greedily building protein networks with confidence. Bioinformatics, 19(15):1869-1874, 2003.

P. M. Bowers, M. Pellegrini, M. J. Thompson, J. Fierro, T. O. Yeates, and D. Eisenberg. Prolinks: a database of protein functional linkages derived from coevolution. Genome Biology, 5(5):R35, 2004.

S. Brin and L. Page. The anatomy of a large-scale hypertextual Web search engine. Computer Networks and ISDN Systems, 30:107-117, 1998.

T. Can, O. C, amo.glu, and A. K. Singh. Analysis of protein-protein interaction networks using random walks. In Proceedings of the 5th ACM SIGKDD Workshop on Data Mining in Bioinformatics, Chicago, Aug. 2005.

M. A. Collart. Global control of gene expression in yeast by the Ccr4-Not complex. Gene, 313:1-16, 2003.

G. M. D. Corso. Estimating an eigenvector by the power method with a random start. SIAM J. Matrix Anal. Appl., 18(4):913-937, 1997.

A. C. Gavin, M. Bosche, R. Krause, P. Grandi, M. Marzioch, A. Bauer, J. Schultz, J. M. Rick, A. M. Michon, and C. M. Cruciat. Functional organization of the yeast proteome by systematic analysis of protein complexes. Nature, 415:141-147, 2002.

Y. Ho, A. Gruhler, A. Heilbut, G. D. Bader, L. Moore, S. L. Adams, A. Millar, P. Taylor, K. Bennett, and K. Boutilier. Systematic identification of protein complexes in *Saccharomyces cerevisiae* by mass spectrometry. Nature, 415:180-183, 2002.

H. Hu, X. Yan, Y. Huang, J. Han, and X. J. Zhou. Mining coherent dense subgraphs across massive biological networks for functional discovery. Bioinformatics, 21(Suppl. 1):i213-i221, 2005.

T. Ito, T. Chiba, R. Ozawa, M. Yoshida, M. Hattori, and Y. Sakaki. A comprehensive two-hybrid analysis to explore the yeast protein interactome. Proc. Natl. Acad. Sci., 98:4569-4574, 2001.

R. Jansen, H. Yu, D. Greenbaum, Y. Kluger, N. J. Krogan, S. Chung, A. Emili, M. Snyder, J. F. Greenblatt, and M. Gerstein. A bayesian networks approach for predicting protein-protein interactions from genomic data. Science, 302:449-453, Oct. 2003.

G. R. G. Lanckriet, M. Deng, N. Cristianini, M. I. Jordan, and W. S. Noble. Kernel-based data fusion and its application to protein function prediction in yeast. In Proceedings of PSB, 2004.

E. Larschan and F. Winston. The *Saccharomyces cerevisiae* Srb8-Srb11 complex functions with the SAGA complex during Gal4-activated transcription. Mol Cell Biol, 25(1):114-123, 2005.

I. Lee, S. V. Date, A. T. Adai, and E. M. Marcotte. A probabilistic functional network of yeast genes. Science, 306:1555-1558, Nov. 2004.

S. Letovsky and S. Kasif. Predicting protein function from protein/protein interaction data: a probabilistic approach. Bioinformatics, 19:i197-i204, 2003.

L. Lovasz. Random walks on graphs: A survey. Combinatorics, Paul Erdos is Eighty, 2:353-398, 1996.

V. Maytal-Kivity, R. Piran, E. Pick, K. Hofmann, and M. H. Glickman. COP9 signalosome components play a role in the mating pheromone response of *S. cerevisiae*. EMBO reports, 3(12):1215-1221, 2002.

H. W. Mewes, C. Amid, R. Arnold, D. Frishman, U. Guldener, G. Mannhaupt, M. Munsterkotter, P. Pagel, N. Strack, V. Stumpfien, J. Warfsmann, and A. Ruepp. MIPS: analysis and annotation of proteins from whole genomes. Nucleic Acids Research, 32:D41-D44, 2004.

A. Y. Ng, A. X. Zheng, and M. I. Jordan. Link analysis, eigenvectors, and stability. In International Joint Conference on Artificial Intelligence (IJCAI), 2001.

C. J. Roberts et al. Signaling and circuitry of multiple MAPK pathways revealed by a matrix of global gene expression profiles. Science, 287:873-880, 2000.

D. Scholtens, M. Vidal, and R. Gentleman. Local modeling of global interactome networks. Bioinformatics, 21(17):3548-3557, 2005.

H.-J. Schuller. Transcriptional control of nonfermentative metabolism in the yeast *Saccharomyces cerevisiae*. Curr Genet, 43:139-160, 2003. [.

J. Scott, T. Ideker, R. M. Karp, and R. Sharan. Efficient algorithms for detecting signaling pathways in protein interaction networks. In Proceedings of RECOMB, 2005.

K. Tsuda and W. S. Noble. Learning kernels from biological networks by maximizing entropy. Bioinformatics, 20(S1):i326-i333, 2004.

P. Uetz, G. Cagney, T. A. Mansfield, R. Judson, J. R. Knight, D. Lockshon, V. Narayan, M. Srinivasan, and P. Pochart. A comprehensive analysis of protein-protein interactions in *saccharomyces cerevisiae*. Nature, 403:623-627, 2000.

C. von Mering, L. J. Jensen, B. Snel, S. D. Hooper, M. Krupp, M. Foglierini, N. Jouffre, M. A. Huynen, and P. Bork. STRING: known and predicted protein-protein associations, integrated and transferred across organisms. Nucleic Acids Research, 33:D433-D437, 2005.

C. von Mering, R. Krause, B. Snel, M. Cornell, S. G. Oliver, S. Fields, and P. Bork. Comparative assessment of large-scale data sets of protein-protein interactions. Nature, 417:399-403, May 2002.

J. Weston, A. Elisseeff, D. Zhou, C. S. Leslie, and W. S. Noble. Protein ranking: From local to global structure in the protein similarity network. Proc. Natl. Acad. Sci., 101:6559-6563, 2004.

P. Y. Wu et al. Molecular architecture of the *S. cerevisiae* SAGA complex. Mol Cell, 15(2):199-208, 2004.

Y. Yamanishi, J.-P. Vert, and M. Kanehisa. Protein network inference from multiple genomic data: a supervised approach. Bioinformatics, 20(S1):i363-i370, 2004.

PCT International Search Report and the Written Opinion of the International Searching Authority for PCT/US07/05113, mailed on Feb. 27, 2008.

* cited by examiner

| Subgraph | Structure | Support |
|---|---|---|
| $g_1$ | A—B | 4 {$G_1, G_2, G_3, G_4$} |
| $g_2$ | A—B—B | 3 {$G_1, G_2, G_4$} |
| $g_3$ | triangle A-B-B | 2 {$G_1, G_2$} |
| $g_4$ | A—B—B with C | 2 {$G_2, G_4$} |
| $g_5$ | triangle A-B-B with C | 1 {$G_2$} |

FIG. 6

GRAPH QUERYING, GRAPH MOTIF MINING AND THE DISCOVERY OF CLUSTERS

CROSS-REFERENCE TO RELATED APPLICATIONS

This application is a continuation under 35 U.S.C. Section 120 of co-pending and commonly-assigned U.S. Utility patent application Ser. No. 11/711,326, filed Feb. 27, 2007, by Ambuj Kumar Singh, Huahai He, Tolga Can and Orhan Camoglu, entitled "GRAPH QUERYING, GRAPH MOTIF MINING AND THE DISCOVERY OF CLUSTERS,", which application claims the benefit under 35 U.S.C. Section 119(e) of and commonly-assigned U.S. Provisional Patent Application Ser. No. 60/777,037, filed Feb. 27, 2006, by Ambuj Singh and Huahai He, entitled "TECHNIQUE FOR GRAPH QUERIES BASED ON NOVEL INDEX STRUCTURE,"; and U.S. Provisional Patent Application Ser. No. 60/822,487, filed Aug. 15, 2006, by Tolga Can, Orhan Camoglu and Ambuj Singh, entitled "GRAPH QUERYING, GRAPH MOTIF MINING AND THE DISCOVERY OF CLUSTERS,"; all of which applications are incorporated by reference herein.

STATEMENT REGARDING FEDERALLY SPONSORED RESEARCH AND DEVELOPMENT

This invention was made with Government support under Grant No. DB1-0213903 awarded by the NSF. The Government has certain rights in this invention.

BACKGROUND OF THE INVENTION

1. Field of the Invention

The invention is related to a method for analyzing, querying, and mining graph databases using subgraph and similarity querying of graph databases.

2. Description of the Related Art (Note: This application references a number of different publications as indicated throughout the specification by one or more reference numbers within brackets, e.g., [x]. A list of these different publications ordered according to these reference numbers can be found below in Section G below entitled "References." Each of these publications is incorporated by reference herein.)

Recent technological and scientific advances have resulted in an abundance of data that describe and model phenomena in terms of graphs: primitive components and relationships between them. Querying and mining of these graphs has the potential to advance our understanding in numerous ways: understanding of new connectivity patterns and evolutionary changes, discovery of topological features, and synthesis of new models.

Graph data models have been studied in the database community for semantic data modeling, hypertext, geographic information systems, XML, multimedia, and schema matching and integration. For example, schema of heterogeneous web-based data sources and e-commerce sites can be modeled as graphs and the problem of schema matching and integration can be solved through graph matching. In a recent study, video data scenes were modeled as graphs of primitive objects and similarity queries were answered through graph isomorphism.

More broadly, graphs have been used for modeling biological pathways, chemical compounds, protein structures, social networks, and taxonomies. For example, a metabolic pathway is modeled as a set of reactions, enzymes, and metabolites, and an edge is placed between a reaction and a metabolite (or enzyme) if it participates in the reaction. Similarly, the 3D structure of proteins can be modeled as contact maps: atoms whose distance is less than a threshold have an edge between them.

One important class of graph data is the genome-level protein interaction networks constructed from integration of high-throughput sources (microarrays, RNAi, bioimages) with genomics and literature data. These networks are inherently probabilistic.

Understanding such protein interactions is an essential aspect of biology. A systems level understanding of the signaling pathways and networks in a disease model allows one to evaluate the consequences of modulating activity, expression levels, or post-translational modification of a potential drug discovery target.

Understanding protein interactions within a pathway and interaction between pathways permits selection of a target that, when modulated, addresses disease condition with minimum impact on other physiological processes. Systems level information about protein-protein interactions provides novel opportunities for drug discovery by expanding knowledge of protein function, while generating a large new class of potential targets.

Since protein-protein interactions play a fundamental role in all biological and pathological processes, they represent attractive targets for therapeutic intervention. One can select small molecules that specifically disrupt particular protein-protein interactions. Alternatively, critical evaluation of protein interactions within a network can lead to selection of a specific protein target (e.g. enzyme, receptor) readily amenable to intervention by a drug-like small molecule.

What is needed then is a technique for analyzing, querying, and mining graph data, especially in genome-level protein interaction networks. The present invention satisfies this need.

SUMMARY OF THE INVENTION

The present invention discloses a method for analyzing, querying, and mining graph databases using subgraph and similarity querying. An index structure, known as a closure tree, is defined for topological summarization of a set of graphs. In addition, a significance model is created in which the graphs are transformed into histograms of primitive components. Finally, connected substructures or clusters, comprising paths or trees, are detected in networks found in the graph databases using a random walk technique and a repeated random walk technique.

BRIEF DESCRIPTION OF THE DRAWINGS

Referring now to the drawings in which like reference numbers represent corresponding parts throughout:

FIG. 6 illustrates frequent subgraphs and their supports according to the preferred embodiment of the present invention.

DETAILED DESCRIPTION OF THE INVENTION

Figure 1:
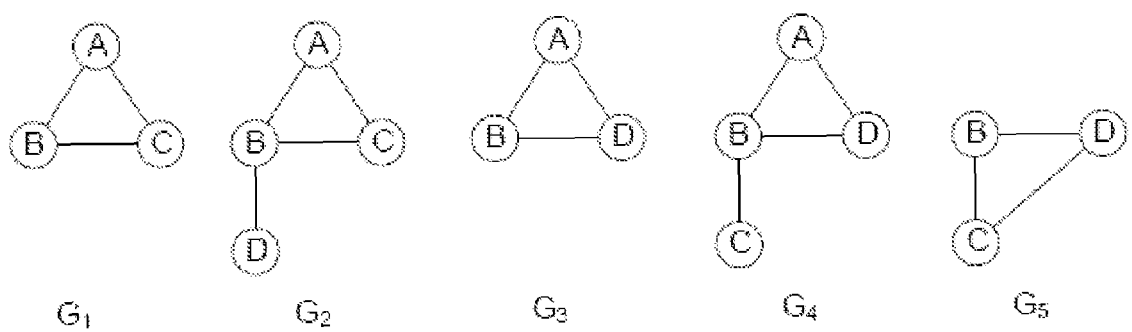
FIG. 1 illustrates a sample graph database according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

A Overview

In the present invention, we have considered two kinds of graph databases: a large collection of small graphs (number of nodes and edges in hundreds), or a small collection of large graphs (number of nodes and edges in tens of thousands or millions). A chemical compound dataset is a good example of the former while protein interaction networks are a good example of the latter. Emerging applications of graph databases such as schema matching, social networks, food webs, and ontologies will generate data with their own unique characteristics. The development of general-purpose techniques for analyzing, querying, and mining the above kinds of graphs is the principal thrust of the present invention.

A.1 Graph Querying

The understanding of a collection of graphs can be accelerated through the use of a graph database that supports elementary querying and mining mechanisms. Query processing on graphs is challenging for a number of reasons. It is difficult to give a meaningful definition of graph similarity. Pairwise graph comparison is computationally difficult. Subgraph isomorphism is known to be NP-Complete and it is not known if graph isomorphism is in the complexity class P. Graph datasets can also be very large, leading to a large number of pairwise comparisons. Reducing the number of graph comparisons through good summarization and heuristics is a primary motivation.

Queries in graph databases can be broadly classified into two categories: subgraph queries and similarity queries. In posing subgraph queries, one looks for a specific pattern in the graph database. The pattern can be either a small graph or a graph where some parts are uncertain, e.g., vertices with wildcard labels. Subgraph queries are useful in a number of applications such as finding structural motifs in (chemical compound or protein) 3D structures, or interconnection patterns in database schemas. In posing similarity queries, one looks for graphs that are similar to a given graph. There are two common kinds of similarity queries: A K-NN query finds K nearest graphs to the query graph; a range query finds graphs within a specified distance to the query graph. Similarity queries can be used as a building block for applications such as classification and evolutionary studies.

Section B below addresses subgraph and similarity querying in graph databases. A novel index structure, called Closure tree, has been defined for the topological summarization of a set of graphs.

A.2 Graph Motif Mining

Mining of structured patterns is useful for understanding the intrinsic characteristics of scientific data. In studies of complex networks such as genetic and metabolic networks, network motifs are defined as structured patterns that appear significantly more frequently than those in randomized networks. Finding unusual common substructures, e.g., subgraphs, plays an important role in the analysis of these complex networks. While the current techniques focus on finding frequent structured patterns, the statistical significance of a pattern is seldom addressed. Since users are interested in a few but significant patterns, lack of significance ranking limits the usefulness of these techniques. The problem becomes worse if the number of generated yet unordered patterns is large. We have developed a statistical model for assigning significance to discovered patterns.

Section C below describes a novel significance model in which graphs are transformed into histograms of primitive components. The probability of occurrence of a subgraph in a graph is computed in the histogram domain. Based on this probability, we establish the probability distribution of a subgraph's support in a graph database. The significance of a subgraph is defined using this distribution.

A.3 Discovery of Clusters

Understanding large-scale probabilistic networks such as protein interaction networks is a challenging task that often requires the detection of well-connected substructures (clusters) in the networks. These connected substructures, usually paths or trees, correspond to meaningful patterns (e.g., metabolic or signaling pathways under which a group of proteins work together to carry out certain biological activities).

Section D below describes an invention comprising a technique based on random walks and repeated random walks, wherein new theoretical bounds to speed up the basic algorithm.

B Closure-Tree: An Index Structure for Graph Queries

Graphs have become popular for modeling structured data. As a result, graph queries are becoming common and graph indexing has come to play an essential role in query processing. We introduce the concept of a graph closure, a generalized graph that represents a number of graphs. Our indexing technique, called Closure-tree, organizes graphs hierarchically where each node summarizes its descendants by a graph closure. Closure-tree can efficiently support both subgraph queries and similarity queries. Subgraph queries find graphs that contain a specific subgraph, whereas similarity queries find graphs that are similar to a query graph. For subgraph queries, we propose a technique called pseudo subgraph isomorphism which approximates subgraph isomorphism with high accuracy. For similarity queries, we measure graph similarity through edit distance using heuristic graph mapping methods. We implement two kinds of similarity queries: K-NN query and range query. Our experiments on chemical compounds and synthetic graphs show that for subgraph queries, Closure-tree outperforms existing techniques by up to two orders of magnitude in terms of candidate answer set size and index size. For similarity queries, our experiments validate the quality and efficiency of the presented algorithms.

B.1 Introduction

As noted above, recent technological and scientific advances have resulted in an abundance of data that describe and model phenomena in terms of primitive components and relationships between them. Querying and mining of the resulting graphs has the potential to advance our understanding in numerous ways: understanding of new connectivity patterns and evolutionary changes, and discovery of topological features. Graph data models have been studied in the database community for semantic data modeling, hypertext, geographic information systems, XML, multimedia [1], and schema matching and integration [2]. For example, schema of heterogeneous web-based data sources and e-commerce sites can be modeled as graphs and the problem of schema matching and integration solved through graph matching. In a recent study, video data scenes were modeled as graphs of primitive objects and similarity queries were answered through graph isomorphism [3]. More broadly, graphs have been used for modeling biological pathways [4], chemical compounds [5], protein structures [6], social networks [7], and taxonomies [8, 9]. For example, a metabolic pathway is modeled as a set of reactions, enzymes, and metabolites, and an edge is placed between a reaction and a metabolite (or enzyme) if it participates in the reaction. Similarly, the 3D structure of proteins can be modeled as contact maps: atoms whose distance is less than a threshold have an edge between them.

In all the above cases, the understanding of a collection of graphs can be accelerated through the use of a graph database that supports elementary querying mechanisms. Queries in graph databases can be broadly classified into two categories. In the first category, one looks for a specific pattern in the graph database. The pattern can be either a small graph or a graph where some parts are uncertain, e.g., vertices with wildcard labels. We call this a subgraph query. Subgraph queries are useful in a number of applications such as finding structural motifs in protein 3D structures, and pathway discovery in protein interaction graphs. In the second query category, one looks for graphs that are similar to a given graph. We call this a similarity query. There are two common kinds of similarity queries: A K-NN query finds K nearest graphs to the query graph; a range query finds graphs within a specified distance to the query graph. Similarity queries can be used as a building block for applications such as schema matching and classification.

Query processing on graphs is challenging for a number of reasons. Pairwise graph comparisons are usually difficult. For subgraph queries, one faces the subgraph isomorphism problem, known to be NP-Complete. For similarity queries, it is difficult to give a meaningful definition of graph similarity. The problem is also not known to be in the complexity class P. Graph datasets can also be very large, leading to a number of pairwise comparisons. Reducing the number of graph comparisons through good summarization and heuristics is the primary motivation for graph index structures.

B.1.1 Related Work

Several indexing techniques have been developed for graph queries. Shasha et al. [10] proposed a path-based technique called GraphGrep. GraphGrep enumerates paths up to a threshold length from each graph. An index table is constructed where each row stands for a path and each column stands for a graph. Each entry in the table is the number of occurrences of the path in the graph. Queries are processed in two phases. The filtering phase generates a set of candidate graphs for which the count of each path is at least that of the query. The verification phase verifies each candidate graph by subgraph isomorphism and returns the answer set.

Yan et al. [11] proposed GIndex that uses frequent patterns as index features. Frequent patterns reduce the index space as well as improve the filtering rate. Experimental results show that their technique has 10 times smaller index size than that of GraphGrep, and outperforms GraphGrep by 3-10 times in terms of the candidate answer set size. In a subsequent paper, the authors have extended their idea to partial matches of given queries [12].

GraphGrep and GIndex have some common disadvantages. First, they do not support, graphs where attributes on vertices or edges are continuous values. The underlying reason is that the index features need to be matched exactly with the query. Second, their index construction requires an exhaustive enumeration of paths or fragments with high space and time overhead. Third, since paths or fragments carry little information about a graph, loss of information at the filtering step appears unavoidable.

Berretti et al. [1] proposed a metric based indexing on attributed relational graphs (ARGs) for content-based image retrieval. Graphs are clustered hierarchically according to their mutual distances and indexed by M-trees [13]. Queries are processed in a top-down manner by routing the query along the reference graphs of clusters. Triangle inequality is used for pruning unnecessary nodes. More recently, Lee et al. [3] use a graphical representation for modeling foreground and background scenes in videos. These graphs are clustered using the edit distance metric, and similarity queries are answered using a multi-level index structure.

B.1.2 The Approach of the Present Invention

We develop a tree-based index called Closure-tree, or C-tree. Each node in the tree contains discriminative information about its descendants in order to facilitate effective pruning. This summary information is represented as a graph closure, a "bounding box" of the structural information of the constituent graphs. Our approach has a number of advantages:

1. C-tree can support both subgraph queries and similarity queries on various kinds of graphs.

2. C-tree extends many techniques developed for spatial access methods, e.g., R-trees [14, 15].

3. Graph closures capture the entire structure of constituent graphs, which implies high pruning rates.

4. Dynamic insertion/deletion and disk-based access of graphs can be done efficiently.

5. C-tree avoids an exhaustive enumeration procedure as in GraphGrep and GIndex.

6. The approach taken by C-tree can be contrasted by graph indexing approaches based on M-trees [1, 3], where the summary graph in the index structure (routing object) is a database graph; in our approach, this graph is a generalized graph that is a structural union of the underlying database graphs.

We perform pairwise graph comparisons using heuristic techniques. For subgraph queries, we tackle the subgraph isomorphism problem by an approximation technique called pseudo subgraph isomorphism. Pseudo subgraph isomorphism produces accurate candidate answers within a polynomial running time. For similarity queries, we define graph similarity based on edit distance, and compute it using heuristic graph mapping methods. All C-tree operations take polynomial time.

C-tree is the first index structure that efficiently supports both subgraph queries and similarity queries on graphs. For subgraph queries, our techniques outperform GraphGrep by up to two orders of magnitude in terms of candidate answer set size and index size. For similarity queries, our experiments demonstrate the quality and efficiency of our techniques. Our work also demonstrates how traditional query and indexing techniques can be extended to graph data.

B.2 Preliminaries

We denote a graph (directed or undirected) G by (V, E) where V is a vertex set and E is an edge set. Vertices and edges have attributes denoted by attr(v) or attr(e). A graph database is a set of graphs $D=(G_1, G_2, \ldots, G_m)$. For convenience, we focus on undirected graphs in which vertices have a single label as their attribute and edges have unspecified but identical labels. However, the concepts and techniques described can be extended to other kinds of graphs.

We assume the usual definition of graph isomorphism.

Definition 1 (Graph Isomorphism). Graph $G_1$ is isomorphic to $G_2$ if there exists a bijection $\phi$ such that for every vertex $v \in V1$, $\phi(v) \in V2$ and $attr(v)=attr(\phi(v))$, and for every edge $e=(v1, v2) \in E1$, $\phi(e)=(\phi(v1), \phi(v2)) \in E2$, and $attr(e)=attr(\phi(e))$.

The concept of subgraph isomorphism can be defined analogously by using an injection instead of a bijection.

Next, we define a relaxed notion of correspondence between two graphs. We extend each graph by dummy vertices and dummy edges such that every vertex and edge has a corresponding element in the other graph. This correspondence allows us to compare graphs of unequal sizes. An extended graph is denoted by $G^*(V^*, E^*)$. A dummy vertex or edge has a special label $\epsilon$ as its attribute.

Definition 2 (Graph Mapping). A mapping between two graphs $G_1$ and $G_2$ is a bijection $\phi\colon G^*_1 \to G^*_2$, where (i) $\forall v \in V_1^*$, $\phi(v) \in V_2^*$, and at least one of v and $\phi(v)$ is not dummy, and (ii) $\forall e \in (v_1, v_2) \in E_1^*$, $\phi(e)=(\phi(v_1), \phi(v_2)) \in E_2^*$; and at least one of e and $\phi(e)$ is not dummy.

Now, we define the notion of distance between two graphs using edit distance. Generally, the edit distance between two objects is the cost of transforming one object into the other. For graphs, the transformations are the insertion and removal of vertices and edges, and the changing of attributes on vertices and edges. The cost of these transformations can be generally regarded as a distance function between the two elements (in case of insertion and removal, the other element is a dummy). Given two graphs $G_1$ and $G_2$, we can find a mapping $\phi$ between $G^*_1$ and $G^*_2$, and compute the distance under this mapping.

Definition 3 (Edit Distance under $\phi$). The edit distance between two graphs $G_1$ and $G_2$ under a mapping $\phi$ is the cost of transforming $G_1$ into $G_2$:

$$d_\phi(G_1, G_2) = \sum_{v \in V_1^*} d(v, \phi(v)) + \sum_{e \in E_1^*} d(e, \phi(e)) \quad (1)$$

where $d(v, (\phi(v)))$ and $d(e, \phi(e))$ are the vertex distance and the edge distance measures, respectively.

The vertex and edge distance measures are application specific. For simplicity, we assume a uniform distance measure: the distance between two vertices or two edges is 1 if they have different labels; otherwise it is 0.

We can now define edit distance between graphs.

Definition 4 (Graph Distance). The distance between two graphs $G_1$ and $G_2$ is the minimum edit distance under all possible mappings:

$$d(G_1, G_2) = \min_\phi \{d_\phi(G_1, G_2)\} \quad (2)$$

Note that the distance between isomorphic graphs is zero. If the vertex and edge distances are metric, then the graph distance is also a metric. Edit distance to a null graph (having no vertices and no edges) defines the norm of a graph.

We now define the asymmetric notion of subgraph distance.

Definition 5 (Subgraph Distance). The subgraph distance from $G_1$ to $G_2$ is the minimum distance between $G_1$ and any subgraph of $G_2$:

$$d_{sub}(G_1, G_2) = \min\{d(G_1, H) | H \subseteq G_2\} \quad (3)$$

Subgraph distance can also be obtained by considering graph mappings and limiting distance consideration to the non-dummy vertices and edges in the first graph:

$$d_{sub}(G_1, G_2) = \min_\phi \left\{ \sum_{v \in V_1} d(v, \phi(v)) + \sum_{e \in E_1} d(e, \phi(e)) \right\} \quad (4)$$

In some graph applications, graph similarity is more meaningful than distance, especially when the underlying vertex and distance measures are based on similarity. This notion of similarity is defined as follows.

Definition 6 (Graph Similarity). The similarity between two graphs $G_1$ and $G_2$ under a mapping $\phi$ is the sum of similarities between vertices and edges in $G_1$ and their images in $G_2$:

$$Sim_\phi(G_1, G_2) = \sum_{v \in V_1^*} sim(v, \phi(v)) + \sum_{e \in E_1^*} sim(e, \phi(e)) \quad (5)$$

where $sim(v, \phi(v))$ and $sim(e, \phi(e))$ are the vertex similarity and the edge similarity measures, respectively. The similarity between two graphs is the maximum similarity under all possible mappings:

$$Sim(G_1, G_2) = \max_\phi \{Sim_\phi(G_1, G_2)\} \quad (6)$$

We use the notion of uniform similarity as well. For both vertices and edges, it is defined as one minus the distance between them.

An upper bound to similarity can be obtained by considering the vertex sets and the edge sets separately:

$$Sim(G_1, G_2) \leq Sim(V_1, V_2) + Sim(E_1, E_2) \quad (7)$$

where $Sim(V_1, V)$ and $Sim(E_1, E_2)$ are the maximum similarity between two sets of vertices or edges, respectively. This can be computed by constructing a bipartite graph, and finding the maximum matching.

FIG. 1 shows a sample graph database consisting of five graphs. If we use uniform distance measures, then $d(G_1,G_2)=2$, $d_{sub}(G_1,G_2)=0$, $Sim(G_1,G_2)=6$, $d(G_1,G_3)=1$, $d(G_2,G_4)=2$, $Sim(G_4,G_5)=5$, etc.

In practice, we cannot compute the optimal distance or similarity due to high computational complexity. However, we can find a good mapping between two graphs, and compute the approximate distance or similarity between graphs. We will discuss graph mapping methods in Section B.4.

B.3 Graph Closures

Given two graphs and a mapping between them, if we take an element-wise union of the two graphs, then we get a new graph where the attribute of each vertex and each edge is a union of the constituent attribute values. This generalized graph captures the structural information of each graph, and serves as a bounding container. This leads to the concept of a graph closure.

Definition 7 (Vertex Closure and Edge Closure). The closure of a set of vertices is a generalized vertex whose attribute is the union of the attribute values of the vertices. Likewise, the closure of a set of edges is a generalized edge whose attribute is the union of the attribute values of the edges.

In particular, a vertex (or edge) closure may contain the special value c corresponding to a dummy.

Definition 8 (Graph Closure under φ). The closure of two graphs $G_1$ and $G_2$ under a mapping φ is a generalized graph (V, E) where V is the set of vertex closures of the corresponding vertices and E is the set of edge closures of the corresponding edges. This is denoted by closure $(G_1, G_2)$.

The closure of two graphs depends on the underlying graph mapping. We usually leave this mapping implicit. In the case of multiple graphs, we can compute the closure incrementally, i.e., compute the closure $C_1$=closure $(G_1, G_2)$, and then the closure $C_2$=closure $(C_1, G_3)$, and so on.

A graph closure has the characteristics of a graph: only instead of singleton labels on vertices and edges, a graph closure can have multiple labels. The ideas of graph isomorphism, subgraph isomorphism can be extended to them easily. The notion of distance, however, needs to be reconsidered. Since a graph closure represents a set of graphs (akin to a Minimum Bounding Rectangle (MBR) in usual index structures), we define the notion of minimum distance between two graph closures (akin to the minimum distance between two MBRs).

Definition 9 (Minimum Distance between Closures under φ). The minimum distance between two graph closures G1 and G2 under a mapping (p is defined as follows:

$$d_\phi(G_1, G_2) = \sum_{v \in V_1^*} d_{min}(v, \phi(v)) + \sum_{e \in E_1^*} d_{min}(e, \phi(e)) \qquad (8)$$

where the $d_{min}$ distances are obtained using the underlying distance measures for vertices and edges.

For the case of the uniform distance measure, $d_{min}(v, \phi(v))$ and $d_{min}(e, \phi(e))$ is 0 if the closures share a label and is 1 otherwise. The minimum distance between two graph closures is defined as the minimum of the above distance under all possible mappings φ; this is denoted as $d_{min}$. The notion of maximum similarity between graph closures is defined analogously: define the maximum similarity under a mapping, and then take the maximum of these over all possible mappings. This is denoted as $Sim_{max}$.

In the following, the distance between two graph closures refers to the minimum distance, and the similarity refers to the maximum similarity, unless specified otherwise. An upper bound to the similarity between two graph closures can be obtained by considering the vertex sets and the edge sets separately as in Eqn. (7) of Section B.

The distance (or similarity) between a graph G and a graph closure C is a lower bound (or upper bound) to the distance (or similarity) between G and any graph H contained in C.

$$d_{min}(G,C) \leq d(G,H)$$

$$Sim_{max}(G,C) \geq Sim(G,H)$$

A graph closure may contain graphs that do not actually exist in a given dataset (just as an MBR may contain points that do not exist in a given point dataset). To measure the number of graphs that a graph closure can possibly contain, we define the volume of a graph closure:

Definition 10 (Volume of Graph Closure). The volume of a graph closure C is the product of the sizes of its vertex closures VC and its edge closures EC:

$$\text{volume}(C) = \prod_{vc \in VC} |vc| \times \prod_{ec \in EC} |ec| \qquad (9)$$

Figure 2:
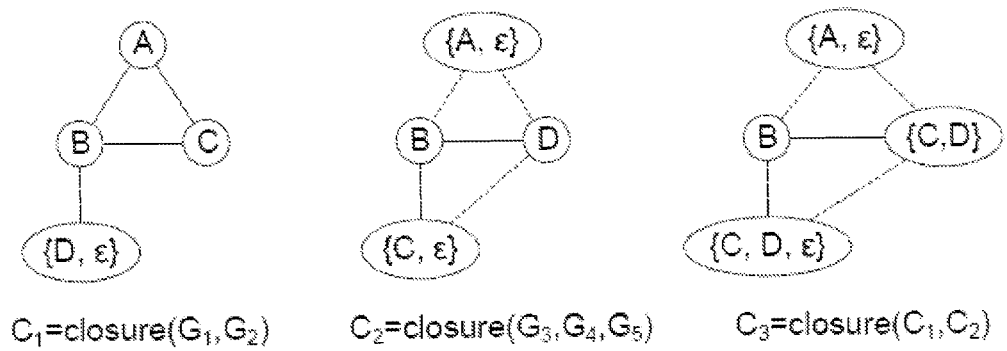
FIG. 2 illustrates some sample graph closures according to the preferred embodiment of the present invention.

FIG. 2 shows some graph closures of the graphs in FIG. 1. The dotted edges represent the closure of a dummy and a non-dummy edge.

The closure of two graphs depends on the graph mapping. In other words, the quality of the summary achieved by a closure depends on the quality of the graph mapping. Next, we discuss different ways of obtaining graph mappings.

B.4 Graph Mapping Methods

We discuss three different ways of finding graph mappings. Since the problem is computationally hard, we rely on heuristics. Though presented in the context of graphs, these techniques are also applicable to graph closures.

B.4.1 State Search Method

A state search method can be used to find the optimal mapping between two small graphs. A branch-and-bound scheme can be implemented as follows. At each search state, we map a free vertex in one graph onto a free vertex in the other graph, and estimate an upper bound of future states using Eqn. (7) of Section B. If the upper bound is less than to equal to the maximum similarity found so far, then the current state can be pruned.

The state search method works well only on small graphs, e.g., graphs of size less than 10. For larger graphs, we need approximate methods. These are discussed next.

B.4.2 Bipartite Method

This method constructs a bipartite graph B between two graphs $G_1$ and $G_2$. The two partitions in B are the vertices from $G_1$ and $G_2$. The edges of B are formed by connecting the vertices across the partitions. The maximum matching in B defines the graph mapping.

The bipartite graph can be either unweighted or weighted, based on the similarity measure used. If it is unweighted, then the maximum matching is computed using Hoperoft and Karp's algorithm [16]. If it is weighted, then the maximum matching is computed by the Hungarian algorithm [17, 18]. The weight between two vertices is measured by the similarity of their attributes as well as their neighbors. Using matrix iteration, weights can be propagated to all the vertices until convergence. Heymans and Singh [19] used this method to compute the similarity between metabolic pathway graphs.

B.4.3 Neighbor Biased Mapping (NBM)

In the bipartite method, the similarity between any two vertices is fixed during the computation of the graph mapping. There is no effort made to bias the matching towards neighbors of already matched vertices, i.e., even if two vertices have been matched, the chance that their neighbors will be matched does not increase. As a result, the common substructures of the two graphs are not captured well.

In order to find common substructures, we develop a new graph mapping method called Neighbor Biased Mapping (NBM), shown in Algorithm NBM below. Initially, a weight matrix W is computed where each entry $W_{u,v}$ represents the similarity of vertex $u \in G_1$ and vertex $v \in G_2$. A priority queue PQ maintains pairs of vertices according to their weights. For each vertex in $G_1$, its most similar vertex is found in $G_2$, and the pair is added to PQ. At each iteration, the best pair (u, v) of unmatched vertices in the priority queue is chosen and marked as matched. Then, the neighboring unmatched pairs of (u, v) are assigned higher weights, thus increasing their chance of being chosen. The iterations continue until all vertices in graph $G_1$ have been matched.

---

Algorithm NBM

Compute the initial similarity matrix W for $G_1$ and $G_2$;
for each $u \in G_1$ do
    Find $v_m$ such that $W_{u,v_m} = \max\{W_{u,v} | v \in G_2\}$
    PQ.Insert($W_{u,v_m}$,⟨u, $v_m$⟩)
    mate[u] := $v_m$ // best mate of u
    wt[u] := $W_{u,v_m}$ // best weight of u
while PQ is not empty do
    ⟨u, v⟩ := PQ.dequeue( )
    if u is matched then
        continue
    if v is matched then
        Find $v_m$ such that
        $W_{u,v_m} = \max\{W_{u,v'} | v' \in G_2, v'$ is unmatched$\}$
        PQ.Insert($W_{u,v_m}$,⟨u, $v_m$⟩)
        mate[u] := $v_m$
        wt[u] := $W_{u,v_m}$
        continue
    Mark⟨u, v⟩ as matched
    Let $N_u, N_v$ be the neighbors of u, v
    for each u' $\in N_u$, u' is unmatched do
        for each v' $\in N_v$, v' is unmatched do
            Add weights to $W_{u',v'}$
            if $W_{u',v'}$ > wt[u'] then
                mate[u'] := v'
                wt[u'] := $W_{u',v'}$
            if wt[u'] has changed then
                PQ.Insert(wt[u'],⟨u', mate[u']⟩)
return all matches

---

The time complexity of the algorithm can be computed as follows. Let n be the number of vertices and d be the maximum degree of vertices. The initial computation of matrix W and insertions into the priority queue take $O(n^2)$ time, assuming uniform distance measures. In each iteration, the algorithm removes one pair from and inserts at most $d^2$ unmatched pairs into the priority queue. Totally, there are O(n) iterations. Thus, the time complexity is $O(nd^2 \log n)$.

B.5 Closure-Tree

In this section, we describe the structure of C-tree and various operations on it, including insertion, splitting, deletion, and tree construction. All the operations take polynomial time.

B.5.1 Tree Structure

A C-tree is a tree of nodes where:
1. Each node is a graph closure of its children. The children of an internal node are nodes; the children of a leaf node are database graphs.
2. Each node has at least m children unless it is root, $m \geq 2$.
3. Each node has at most M children, $(M+1)/2 \geq m$.

Figure 3:
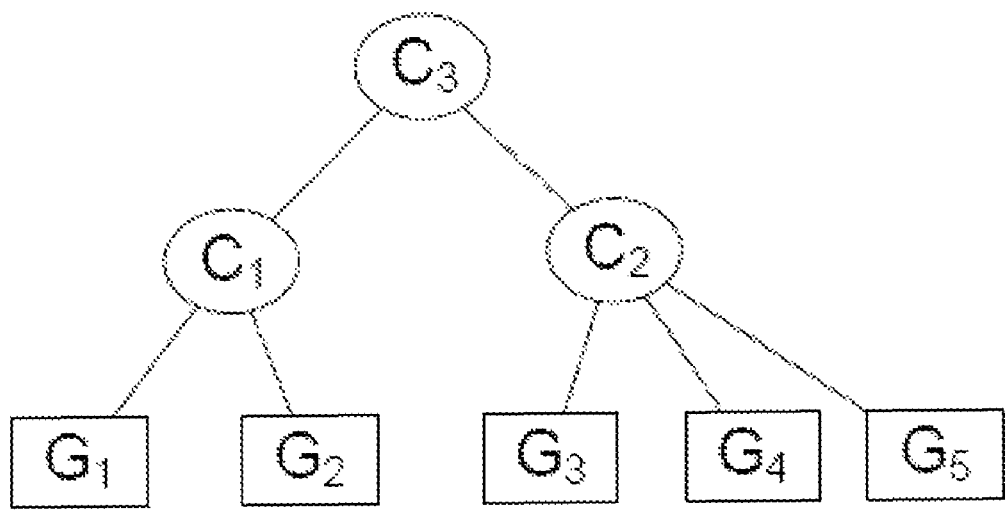
FIG. 3 illustrates an exemplary closure-tree according to the preferred embodiment of the present invention.

FIG. 3 shows an example of a C-tree for the sample graph database where the graph closures are shown in FIG. 2.

The structure of C-tree is similar to that of tree-based spatial access methods, e.g., R-trees [14]. The main difference is that each node in C-tree is represented by a graph closure instead of an MBR. Operations of a C-tree are analogous to that of an R-tree.

B.5.2 Insertion

Given a new graph, an insertion operation begins at the root and iteratively chooses a child node until it reaches a leaf node. The given graph is inserted at this leaf node. Graph closures at each node along the path are enlarged accordingly. The main challenge of insertion is the criterion for choosing a child node. We describe several such criteria next.

Random selection. Choose a child node randomly.

Minimizing the increase of volume. Choose a child node that results in the minimum increase of volume (Eqn. 10 of Section B).

Minimizing the overlap of nodes. Choose a child node that results in the minimum increase of overlaps. The overlap of two nodes is measured by the similarity of their graph closures (Eqn. 6 of Section B). A practical consideration is to achieve a trade off between quality and running time. We choose the second criterion, which takes time linear in the number of child nodes.

B.5.3 Splitting

When a C-tree node has more than M child nodes because of insertion, it has to be split into two nodes. Splitting may cause the parent node to split as well and this procedure may repeat all the way up to the root. We need a criterion for partitioning the child nodes into two groups. Several options are possible:

Random Partitioning. Randomly and evenly partition the child nodes into two groups.

Optimal partitioning. Consider all possible partitions of child nodes and choose the one with the minimum sum of volumes.

Linear partitioning. Choose a pivot and partition the child nodes based on the pivot. The idea is inspired by Fastmap [20]. The procedure is described as follows.
1. Randomly choose a node $g_0$.
2. Choose the farthest node $g_1$ from $g_0$ (using graph closure distance).
3. Choose the farthest node $g_2$ from $g_1$. The pair of nodes ($g_1, g_2$) becomes the pivot.
4. For all $g_i$, sort $d(g_i, g_1)-d(g_i, g_2)$ in ascending order. Then, assign the first half to one group and the rest to the other group.

Linear partitioning takes time linear in the number of child nodes. We use this criterion in our implementation.

B.5.4 Deletion

To delete a graph from a C-tree, we find the leaf node u where the graph is stored, and delete the graph. Graph closures at nodes along the path are shrunk accordingly. After deletion, if u has less than m entries, then u is deleted and its entries are reinserted. This procedure may propagate up to the root, but entries of non-leaf nodes are reinserted at a higher level.

B.5.5 Tree Construction

A straightforward approach to building a C-tree is by inserting the graphs sequentially. However, the tree structure will not be globally optimized since it is affected by the insertion order. Further, this approach involves a large number of insertion and splitting operations. An alternative approach is to build the C-tree in combination with some clustering algorithm. In our implementation, we use hierarchical clustering [21] to build the C-tree.

B.6 Subgraph Queries

Subgraph queries find all graphs that contain a specific subgraph. Section B.6.1 presents our approximation algorithm for subgraph isomorphism. Section B.6.2 describes the processing of subgraph queries on a C-tree.

B.6.1 Pseudo Subgraph Isomorphism

Since subgraph isomorphism is an NP-hard problem, avoiding complete subgraph isomorphism tests is an important concern in index construction and query processing. We tackle the problem by an approximation technique called pseudo subgraph isomorphism. Though the presentation in this section is in the context of graphs, the ideas also hold for graph closures.

Given a graph G and a vertex $u \in G$, we define a level-n adjacent subgraph of u as a subgraph derived from G that contains all vertices reachable from u within a distance of n. Given two graphs $G_{1,2}$ and two vertices $u \in G_1$, $v \in G_2$, u is called level-n compatible to v if the level-n adjacent subgraph of u is sub-isomorphic to that of v.

Based on level-n compatibility, we can construct a bipartite graph B for $G_1$ and $G_2$ as follows: the vertex sets of B are the vertex sets of $G_1$ and $G_2$; for any two vertices $u \in G_1$, $V \in G_2$ if u is level-n compatible to v, then (u, v) is an edge in B. If B has a semi-perfect matching, i.e., every vertex in $G_1$ is matched, then $G_1$ is called level-n sub-isomorphic to $G_2$.

When n is large enough, i.e., n equals the size of the vertex set of $G_1$, then level-n sub-isomorphism implies actual subgraph isomorphism. The computation of level-n sub-isomorphism is computationally intensive and does not scale for large n. Therefore, we further approximate adjacent subgraphs by adjacent subtrees.

Definition 11 (Level-n Adjacent Subtree). Given a graph G and a vertex $u \in G$, a level-n adjacent subtree of u is a breadth-first tree on G starting at u and consisting of paths of length $\leq n$.

Note that vertices may appear repeatedly in an adjacent sub-tree.

Definition 12 (Level-n Pseudo Compatible). Vertex u is called level-n pseudo compatible to v if the level-n adjacent subtree of u is sub-isomorphic to that of v.

Definition 13 (Level-n Pseudo Sub-Isomorphism). Given two graphs $G_1$ and $G_2$, define a bipartite graph B as follows: the vertex sets of B are the vertex sets of $G_1$ and $G_2$; for any $u \in G_1$, $v \in G_2$, if u is level-n pseudo compatible to v, then (u, v) is an edge in B. $G_1$ is called level-n pseudo sub-isomorphic to $G_2$ if B has a semi-perfect matching.

Figure 4:
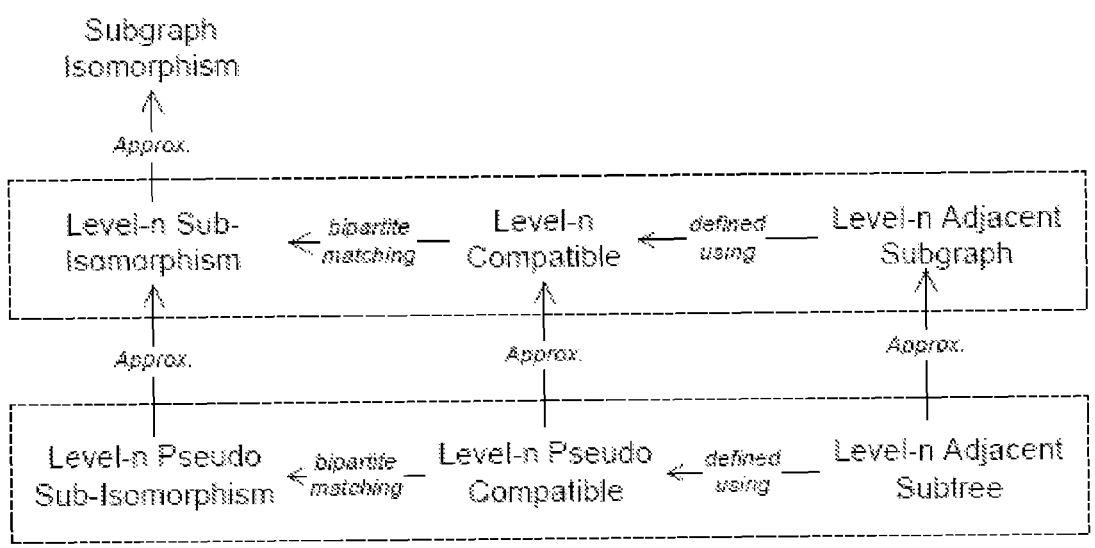
FIG. 4 illustrates the relationship among the definitions according to the preferred embodiment of the present invention.

FIG. 4 outlines the approximation idea. We conceptually approximate subgraph isomorphism by level-n sub-isomorphism using adjacent subgraphs. Then, we approximate level-n sub-isomorphism by level-n pseudo sub-isomorphism using adjacent subtrees. The following lemma establishes that "sub-isomorphism" is a stronger condition than "level-n sub-isomorphism" and "level-n pseudo sub-isomorphism."

Lemma 1. If $G_1$ is sub-isomorphic to $G_2$, then $G_1$ is sub-isomorphic to $G_2$ at any level. If $G_1$ is level-n sub-isomorphic to $G_2$, then $G_1$ is level-n pseudo sub-isomorphic to $G_2$.

Figure 5:
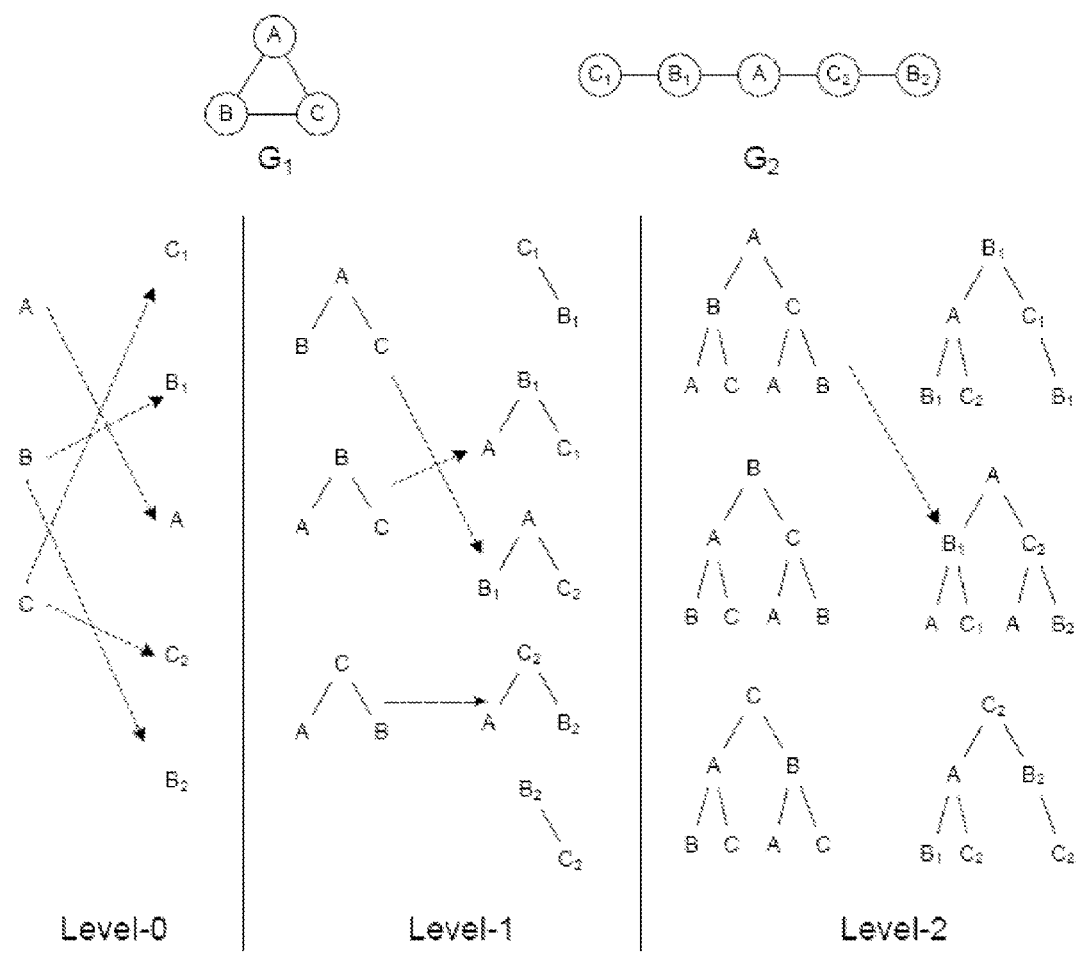
FIG. 5 illustrates an example of pseudo subgraph iso-morphism at levels 0, 1, 2 according to the preferred embodiment of the present invention.

FIG. 5 shows an example of pseudo subgraph isomorphism. Given $G_1$ and $G_2$ (the subscripts of the labels in $G_2$ are used to distinguish vertices with the same label), we construct a bipartite graph starting at level 0. The "vertices" of the bipartite graph are adjacent subtrees of the vertices in $G_1$ and $G_2$. At level-0, the subtree of each vertex is a single vertex. Each vertex in $G_1$ is pseudo compatible to at least one vertex in $G_2$. At level-1, the subtree of vertex B in $G_1$ is not sub-isomorphic to that of vertex $B_2$ in $G_2$. Thus, B is not pseudo compatible to $B_2$. Nor is C to $C_1$. But, the bipartite graph still has a semi-perfect matching. At level-2, neither B nor C in $G_1$ is pseudo compatible to any vertex in $G_2$. The bipartite graph has no semi-perfect matchings. Therefore, $G_1$ is not level-2 pseudo sub-isomorphic to $G_2$.

The following theorem shows that level-n pseudo compatibility can be computed in a recursive way.

Theorem 1 (Level-n Pseudo Compatible). Vertex u is level-n pseudo compatible to vertex v if 1. u is level-0 compatible to v, and
2. let $NG_1(u)$ and $NG_2(v)$ be the neighbors of u and v; define a local bipartite graph B' as follows: for any $u' \in N_{G_1}(u)$, $v' \in N_{G_2}(v)$, $(u',v')$ is an edge in B' if and only if u' is level-(n−1) pseudo compatible to v'. Then, B' has a semi-perfect matching.

The proof follows from the fact that level-n compatibility of a vertex is equivalent to the level-(n−1) compatibility of all its neighbors and the existence of a semi-perfect matching.

Theorem 1 provides an efficient way to compute level-n pseudo compatibility and level-n pseudo subgraph isomorphism. This is encoded in the Algorithm PseudoSubIsomorphic set forth below. Initially, we compute the level-0 compatibility matrix B, where $B_{u,v}=1$ if u can be mapped onto v, e.g., u and v share a label. Next, we refine B in procedure RefineBipartite: for each pair (u, v), a local bipartite graph B' is constructed. If B' has no semi-perfect matchings, then u is not pseudo compatible to v. The refinement continues until B converges or the given level l is reached. Finally, we check if B has a semi-perfect matching. If it does, then $G_1$ is pseudo sub-isomorphic to $G_2$.

The worst case time complexity of the pseudo subgraph isomorphism test is $O(ln_1n_2(d_1d_2+M(d_1,d_2))+M(n_1,n_2))$ where l is the pseudo compatibility level, $n_1$ and $n_2$ are numbers of vertices in $G_1$ and $G_2$, $d_1$ and $d_2$ are the maximum degrees of $G_1$ and $G_2$, M( ) is the time complexity of maximum cardinality matching for bipartite graphs. Hoperoft and Karp's algorithm [16] finds a maximum cardinality matching in $O(n^{2.5})$ time.

Theorem 2. If u is level-$(n_1 n_2)$ pseudo compatible to v, then u is pseudo compatible to v at any level.

Proof. Consider the number of iterations in the outer loop of procedure RefineBipartite of the Algorithm PseudoSubIsomorphic set forth below. At least one entry of B is changed to zero in each iteration before B converges. There are at most $n_1 n_2$ 1's in B, thus B converges in at most $n_1 n_2$ iterations. After convergence, if $B_{u,v}=1$, i.e., u is level-$(n_1 n_2)$ pseudo compatible to v, then $B_{u,v}$ will continue to be 1 if the iteration were continued further beyond $n_1 n_2$ times. Therefore, u is pseudo compatible to v at any level.

Corollary 1. If $G_1$ is pseudo sub-isomorphic to $G_2$ at level $n_1 n_2$, then $G_1$ is pseudo sub-isomorphic to $G_2$ at any level.

B.6.2 Processing of Subgraph Queries

A subgraph query is processed in two phases. The first phase traverses the C-tree, pruning nodes based on pseudo subgraph isomorphism. A candidate answer set is returned. The second phase verifies each candidate answer for exact subgraph isomorphism and returns the answers.

---

Algorithm PseudoSubIsomorphic($G_1$, $G_2$, l)

begin
    for each vertex $u \in G_1$, $v \in G_2$ do
$$B_{u,v} := \begin{cases} 1 & \text{if } attr(u) \cap attr(v) \neq 0; \\ 0 & \text{otherwise.} \end{cases}$$
    RefineBipartite($G_1$, $G_2$, B, l)
    M := MaximumCardinalityMatching(B)
    if M is a semi-perfect matching then -continued

```
Algorithm PseudoSubIsomorphic(G₁, G₂, l)

return true
      else
            return false
end
Procedure RefineBipartite(G₁, G₂, B, l)
      for i := 1 to l do
            for each vertex u ∈ G₁, v ∈ G₂ where B_{u,v} ≠ 0 do
                  Let N_{G₁}(u), N_{G₂}(v) be the neighbors of u and v,
                  construct a local bipartite graph B':
                  for each u' ∈ N_{G₁}(u), v' ∈ N_{G₂}(v) do
                        B'_{u',v'} :=  { 1 if B^{u',v'} ≠ 0;
                                        { 0 otherwise.
                  M' := MaximumCardinalityMatching(B')
                  if M' is NOT a semi-perfect matching then
                        B_{u,v} := 0
            end
            if B is unchanged then break
      end
```

In addition to pruning based on pseudo subgraph isomorphism, a lightweight histogram-based pruning can also be employed. The histogram of a graph is a vector that counts the number of each distinct attribute of the vertices and edges. The histogram of a node is stored at its parent node. Given a query Q and a graph G, let $F_Q$ and $F_G$ be their histograms. If Q is sub-isomorphic to G, then $\forall i \; F_Q[i] \leq F_G[i]$. We use this condition to test a child node before we visit that node. Histogram tests are less accurate but faster than pseudo subgraph isomorphism tests.

Algorithm SubgraphQuery set forth below outlines the code for subgraph query processing. We use Ullmann's algorithm [22] for exact subgraph isomorphism. Note that the compatibility matrix B in the Algorithm PseudoSubIsomorphic can be used to accelerate Ullmann's algorithm.

```
Algorithm SubgraphQuery(query, ctree)

begin
      CS := { }
      Visit(query, ctree.root, CS)
      Ans := { }
      for each G ∈ CS do
            if SubIsomorphic(query, G) then
                  Ans := Ans∪{G}
      return Ans
end
Procedure Visit(query, node, CS)
      for each child c of node node do
            Let G be the graph or graph closure at c;
            if ∀ i F_Q[i] ≤ F_G[i] then
                  if PseudoSubIsomoiphic(query, G) then
                        if c is a database graph then
                              CS := CS∪{G}
                        else
                              Visit(query, c, CS)
      end
```

C Statistical Modeling and Mining of Significant Subgraphs in the Feature Space

The present invention also comprises a technique for evaluating the statistical significance of frequent subgraphs in a database. A graph is represented by a feature vector that is a histogram over a set of basis elements. The set of basis elements is chosen based on domain knowledge and consists generally of vertices, edges, or small graphs. A given subgraph is transformed to a feature vector and the significance of the subgraph is computed by considering the significance of occurrence of the corresponding vector. The probability of occurrence of the vector in a random vector is computed based on the prior probability of the basis elements. This is then used to obtain a probability distribution on the support of the vector in a database of random vectors. The statistical significance of the vector/subgraph is then defined as the p-value of its observed support. We develop efficient methods for computing p-values and lower bounds. A simplified model is further proposed to improve the efficiency. We also address the problem of feature vector mining, a generalization of item-set mining where counts are associated with items and the goal is to find significant sub-vectors. We present an algorithm that explores closed frequent sub-vectors to find significant ones. Experimental results show that the proposed techniques are effective, efficient, and useful for ranking frequent subgraphs by their statistical significance.

C.1 Introduction

As noted above, recent advances in science and technology have generated a large amount of complex data. As a powerful abstract data type, graphs are often used to represent these complex data. In the database community, graph models have been used for schema matching [2], web documents, multimedia [1], and social networks [7]. In biology, graphs have been used to represent molecular structures, protein 3D structures [26], and protein interaction networks [27].

Mining structured patterns in a collection of graphs is useful for understanding the intrinsic characteristics of scientific data. In drug development, frequent pattern mining can reveal conserved substructures in a category of medically effective chemical compounds [28]. In studies of protein interaction networks, conserved patterns in multiple species reveal cellular machinery [27]. In the analysis of protein structures, the presence of conserved subgraphs in protein contact maps can reveal evolutionarily significant patterns of chemical bonds and interactions [26].

A number of techniques have been developed to find frequent subgraphs [29-35] in a transactional database, i.e., a large collection of graphs. However, the usefulness of frequent subgraph mining is limited by two factors:

1. Not all frequent subgraphs are statistically significant.
2. There is no way to rank the frequent subgraphs. This hinders the identification of subgraphs of real interest, especially when the number of discovered frequent subgraphs is large.

For illustrative purposes, consider some frequent subgraphs, shown in FIG. 6, obtained from the sample graph database, shown in FIG. 1. The support of a subgraph is the number of graphs that contain the subgraph. A subgraph is frequent if its support is above a given threshold. Neither the support nor the size of a subgraph is sufficient to measure the statistical significance of a subgraph, and to rank the listed subgraphs.

C.1.1 The Approach of the Present Invention

The present invention provides a technique for computing the statistical significance of frequent subgraphs. The statistical significance of a subgraph g with observed support $\mu 0$ is defined as the probability that g occurs in a database of random graphs with support $\mu = \mu 0$, namely the p-value of g. Using this measure, we can rank the frequent subgraphs, and/or remove insignificant ones.

The main challenge of the above procedure is how to estimate the probability that a subgraph occurs in a random graph. As graphs have flexible structures, it is difficult to estimate such probability directly in the graph space (Note that the problem of determining whether a graph is a subgraph of another is NP-complete). Milo et al [36] adopted a simulation approach: generate many random graphs while maintaining some empirical measures such as degree of vertices, number of edges, and then count the ones that contain the subgraph. However, this approach is neither scalable to a large collection of graphs nor precise for computing and comparing small p-values.

We address the above challenge by transforming graphs into a feature space. First, we use domain knowledge to define a set of basis elements such as vertices, edges, or small subgraphs. A graph is simply regarded as a collection or a histogram of basis elements; this defines its feature vector. Then, we approximate the question of significance of a subgraph by considering the significance of its feature vector in the feature space. This is a simpler problem that admits closed-form solutions. Although structural information of a graph is lost in the feature space, statistics on the basis elements are still captured. As shown by the experimental results, this approximation is suitable for the discovery of significant subgraphs.

In a later portion of this disclosure, we address the problem of feature vector mining, which is a simplified version of graph mining. Vector mining (also known as histogram and multiset mining) is an important generalization of frequent itemset mining. We develop ClosedVect, an algorithm that explores closed sub-vectors to find significant ones. We prove that ClosedVect is optimal in terms of the number of search states.

We validate the quality of our technique through experiments on chemical compounds and synthetic graphs. In particular, we find that a specific subgraph, neither largest nor most frequent, turns out to be the largest common subgraph in a specific class of medically effective compounds. This finding validates the practical usefulness of our approach. We also demonstrate the efficiency of the computational methods and the feature vector mining algorithm.

The main contributions of our work are as follows:

1. We propose a technique for computing the p-values of frequent subgraphs, and show that frequent subgraph can be ranked by this measure.

2. We address the problem of feature vector mining, and present an algorithm for mining significant closed sub-vectors. This is an important problem in its own right.

The remainder of this section is organized as follows: Section C.2 discusses how to represent graphs as feature vectors, Sections C.3 and C.4 present a probabilistic model and a simplified model, and Section C.5 describes the feature vector mining.

C.2 Representing Graphs as Feature Vectors

We view a graph as a collection of basis elements $B=\{\hat{b}_1, \ldots, \hat{b}_m\}$. These basis elements can be vertices, edges, or small graphs. Each basis element $\hat{b}_i$ is associated with a prior probability $\theta_i$. We first discuss how to select basis elements and transform graphs into feature vectors.

C.2.1 Feature Selection

The selection of basis elements is application-dependent and may require domain knowledge. A basic approach is to select all types of vertices or edges as features. The drawback of this approach is that it does not capture any structural information of graphs.

For other graphs such as chemical compounds, one may choose small graphs such as Benzene rings. In this case, the number of small graphs could be large and they may overlap structurally. Thus, selecting a representative subset would be more appropriate. The following criteria for selection can be used: 1) frequency: frequent basis elements are more representative of graphs; 2) size: large basis elements carry more structural information (but would be less frequent); 3) structural overlap: overlapping basis elements are relatively not independent; 4) co-occurrence: basis elements that frequently occur together are not independent. Based on these criteria, one may select basis elements by a greedy approach [16]: choose the $k^{th}$ best element according to its benefit gained (e.g., frequency) and its relevance (e.g., overlap, covariance) to the previously selected k−1 basis elements.

For the sample database shown in FIG. 1, we use all kinds of edges as the basis, i.e., B={A-B, A-C, B-B, B-C, C-C}. The prior probabilities are empirically computed using their frequency in the database, i.e., $$\underline{\theta} = \left(\frac{6}{17}, \frac{2}{17}, \frac{3}{17}, \frac{5}{17}, \frac{1}{17}\right).$$

C.2.2 Transforming Graphs into Feature Vectors

After a basis is selected, we transform (sub)graphs into feature vectors. We denote a feature vector by $\underline{x}=(x_1, \ldots, x_m)$, where $x_i$ counts the frequency of feature $\hat{b}_i$ in the graph. The size of $\underline{x}$ is defined as $|\underline{x}|=\Sigma x_i$. Vector $\underline{x}$ is a sub-vector of $\underline{y}$ (and $\underline{y}$ a super-vector of $\underline{x}$) if $x_i \leq y_i$ for i=1, ..., m, and is denoted by $\underline{x} \subset \underline{y}$. The floor of two vectors $\underline{x}$ and $\underline{y}$ is a vector $\underline{v}$ where $v_i=\min(x_i, y_i)$ for i=1, ..., m. The definition extends to a group of vectors. The ceiling of a group of vectors is defined analogously.

For example, the feature vector of subgraph $g_3$ under the basis B is (2, 0, 1, 0, 0).

C.3 Probabilistic Model

In this section, we model the probability with which a feature vector $\underline{x}$ (corresponding to a subgraph) occurs in a random vector (corresponding to a random graph), and the probability distribution of $\underline{x}$'s support in a database of random vectors. Statistical significance is obtained by comparison to its observed support.

C.3.1 Probability of Occurrence of a Feature Vector in a Random Vector

We regard the basis B as a set of m distinct events, one for every basis element, where basis element $\hat{b}_i$ is associated with its prior probability $\theta_i$. A feature vector of a certain size l is thus regarded as an outcome of l independent trials. Given a feature vector $\underline{y}=(y_1, \ldots, y_m)$, $|\underline{y}|=l$ the probability that $\underline{y}$ is observed in l trials can be modeled by a multinomial distribution:

$$Q(\underline{y}) \frac{\ell!}{\prod y_i!} \prod_{i=1}^{m} \theta_i^{y_i}, \tag{1}$$

In other words, Eqn. (1) of Section C gives the probability of observing $\underline{y}$ in a random vector of size l.

Let $\underline{x}$ be the feature vector of a subgraph g. Then, the probability that $\underline{x}$ occurs in a random vector of l is a cumulative mass function (c.m.f.) of Eqn. (1) of Section C:

$$P(\underline{x}; \ell) = \sum_{\underline{y} \, s.t. \, y_i \geq x_i, |\underline{y}|=\ell} Q(\underline{y}) \tag{2}$$

In other words, this is the probability that $\underline{x}$ occurs in a random vector of size e. The size constraint l is reasonable: the larger a random vector, the more likely that $\underline{x}$ will occur in the vector.

For example, the feature vector of subgraph $g_3$ is $\underline{x}$=(2, 0, 1, 0, 0). The probability that $\underline{x}$ occurs in a random vector of size 3 is $P(\underline{x}; 3)$=0.066.

Eqn. (2) of Section C can be efficiently computed using a divide-and-conquer approach (see [17] for details).

C.3.2 Probability Distribution of a Feature Vector's Support in a Database of Random Vectors Now we consider the support of $\underline{x}$ in the context of a database of random vectors. This support is a random variable that follows a probability distribution. Let n be the number of vectors in the target database, we summarize the sizes of the vectors by $\underline{l}=l_1, \ldots, l_d)$ and $\underline{n}=(n_1, \ldots, n_d)$ where $n_i$ is the number of vectors of size f and $\Sigma n_i=n$.

Figure 7:
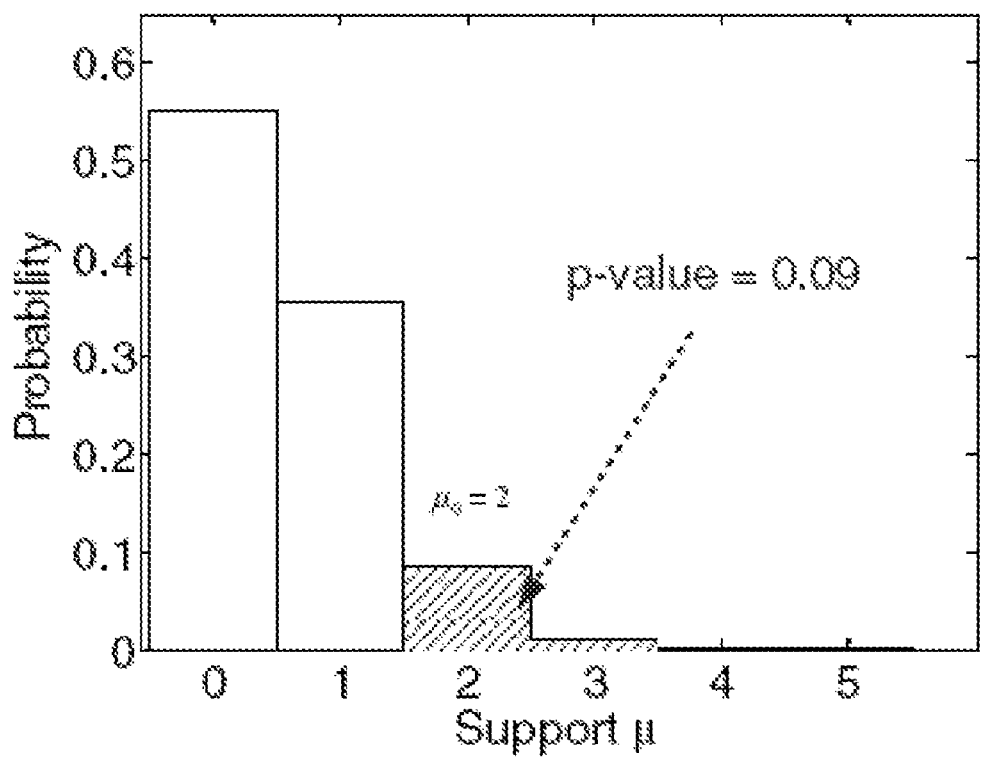
FIG. 7 is a graph that illustrates the probability distribution of $g_3$'s support and its p-value.

If we regard a random vector as a trial, and the occurrence of $\underline{x}$ in the vector as a "success". Then, the database of random vectors corresponds to n trials, and the support of $\underline{x}$ corresponds to the number of successes in n trials. If the sizes of the vectors were identical, say l, then the support can be modeled as a binomial random variable, with parameters n and $P(\underline{x};l)$. When the sizes are distinct, each size will correspond to one binomial random variable with parameters $n_i$ and $P(\underline{x};l)$. Then, the support of $\underline{x}$ is the sum of the binomial random variables: the probability of $\underline{x}$'s support being equal to $\mu$ is given by $$R(\mu; \underline{x}, \underline{\ell}, \underline{n}) = \sum_{\Sigma t_j = \mu}^{d} bino(t_j; n_i, P(\underline{x}; \ell_i)) \tag{3}$$

where $$bino(t; n, p) = \binom{n}{t} p^t (1-p)^{n-t}$$

is the binomial probability distribution. In other words, the $j^{th}$ binomial contributes $t_j$ successes, with the sum of them equal to $\mu$. All possible combinations of $t_j$ give the total probability of observing For the sample database of FIG. 1, a random database would have $\underline{l}=(3,4)$ and $\underline{n}=(3,2)$. FIG. 7 plots the probability distribution of $g_3$'s support in the random database.

Eqn. (3) of Section C can be efficiently computed using a divide-and-conquer approach (see [17] for details).

C.3.3 Statistical Significance of a Feature Vector

Let $\mu_0$ be the observed support in the target database. Then, the p-value, i.e., the probability of observing a support of at least $\mu_0$ in the random database, is given by $$R(\mu \geq \mu_0; \underline{x}, \underline{\ell}, \underline{n}) = \sum_{\mu=\mu_0}^{n} R(\mu; \underline{x}, \underline{\ell}, \underline{n}). \tag{4}$$

The smaller the p-value, the more statistically significant is the feature vector.

TABLE 1

|  | $\bar{\mu}$ | $\mu_0$ | p-value |
|---|---|---|---|
| $g_1$ | 3.84 | 4 | 0.67 |
| $g_2$ | 1.65 | 3 | 0.20 |
| $g_3$ | 0.55 | 2 | 0.09 |
| $g_4$ | 0.85 | 2 | 0.20 |
| $g_5$ | 0.16 | 1 | 0.15 |

Now, we are ready to answer the question regarding significance raised in FIG. 6. Table 1 above shows the p-values of the subgraphs in FIG. 6, as well as their expected supports. Among the subgraphs, $g_3$ has the smallest p-value. Thus, we can claim that $g_3$ is the most statistically significant (though it is neither the largest nor the most frequent).

C.4 A Simplified Model

In this section, we present a simplified model in which the computation of p-values is much more efficient. First, we relax the constraint on the size of random vectors, and consider the probability that a sub-vector occurs in a random vector of arbitrary size. The probability can be written as $$P(\underline{x}) = P(Y_1 \geq x_1, \ldots, Y_m \geq x_m) \tag{5}$$

Further, if we assume that different types of basis elements are orthogonal, then the above joint probability can be decoupled into a product of probabilities:

$$\hat{P}(\underline{x}) = \prod_{i=1}^{m} P(Y_i \geq x_i) \tag{6}$$

where $P(Y_i \geq x_i)$ is the probability that element $\hat{b}_i$ occurs at least $x_i$ times in a random vector. Since $\hat{P}(\underline{x})$ is fixed, we then model the support of $\underline{x}$ by a single binomial distribution, with parameters n and $\hat{P}(\underline{x})$.

Under this model, we compute the p-value as follows.

1. Empirically obtain the prior probabilities $P(Y_i \geq j)$ for every basis element $\hat{b}_i$ and every j (up to the maximum possible value). For example, element $\hat{b}_1$="A-B" occurs twice ($G_1$ and $G_2$) in the sample database, thus $$P(Y_1 \geq 2) = \frac{2}{5}$$

2. Compute $\hat{P}(\underline{x})$ using Eqn. (6) of Section C. For subgraph $g_3$, $\underline{x}=(2, 0, 1, 0, 0)$. Thus, $$\hat{P}(\underline{x}) = P(Y_1 \geq 2) \times P(Y_3 \geq 1) = \frac{2}{5} \times \frac{3}{5} = \frac{6}{25}.$$

3. Compute the p-value of $\underline{x}$ by $\Sigma_{\mu_0}^{n}$ $bino(\mu; n, \hat{P}(\underline{x}))$, or equivalently by the regularized Beta function $I(\hat{P}(\underline{x}); \mu_0, n)$. When both $n\hat{P}(\underline{x})$ and $n(1-\hat{P}(\underline{x}))$ are large, the binomial distribution can be approximated by a normal distribution.

C.5 Feature Vector Mining

As frequent subgraphs are represented as feature vectors and evaluated for statistical significance, an interesting question, arises: can we directly search top-K significant sub-vectors, or sub-vectors above a significance threshold?

To our best knowledge, the problem of feature vector mining has not been addressed before. Feature vector mining is important in two aspects. First, feature vectors, also known as histograms and multisets, are common ways to summarize complex data. As a result, feature vector patterns are profiles of structured patterns, and feature vector mining can work as a foundation of structured pattern mining. Second, feature vector mining is an important generalization of the well studied frequent itemset mining: each item is now associated with a count instead of a boolean value.

We develop the Algorithm ClosedVect, which is set forth below, that explores frequent closed sub-vectors to find significant ones. The algorithm consists of two phases: exploring closed sub-vectors and evaluating the significance of a closed sub-vector.

The Algorithm ClosedVect outlines the phase of exploring closed sub-vectors. The algorithm explores closed sub-vectors in a bottom-up, depth-first manner. At each search state, the algorithm "jumps" to a future state that has an immediately smaller supporting set along a branch (line 3 of the Algorithm ClosedVect). The corresponding sub-vector is then promoted as the floor of the supporting set (line 6 of the Algorithm ClosedVect). To prevent duplicates, each search state is associated with a beginning position b. Any future state must extend at a position greater than or equal to b. If an extension designated at position i results in a starting position of less than i, then it must be a duplicate extension (lines 7-8 of the Algorithm ClosedVect).

The evaluation phase (line 1 of the Algorithm ClosedVect) computes the p-value of a sub-vector and reports top-K significant ones (see [38] for details). Lines 9-10 of the Algorithm ClosedVect estimate a lower bound on the p-value of the super-vectors of x' and prune it if this bound is too high. This pruning is discussed further in [38].

---

Algorithm ClosedVect(x, S, b)

---

$\underline{x}$: current sub-vector;
S: supporting set of $\underline{x}$, i.e., vectors that contain $\underline{x}$;
b: beginning position at which bins can be extended;
1:   Eval($\underline{x}$, |S|);
2:   for i := b to m do
3:     S' ← {$\underline{Y}$|$\underline{Y}$ ∈ S, $Y_i$ > $x_i$};
4:     if |S'| <minSupport then
5:       continue;
6:     $\underline{x}$' := floor(S');
7:     if ∃j < i such that $x'_j$ > $x_j$ then
8:       continue;
9:     if p-value(ceiling(S'), |S'|) ≧ maxPvalue then
10:      continue;
11:     ClosedVect($\underline{x}$', S', i);

---

Figure 8:
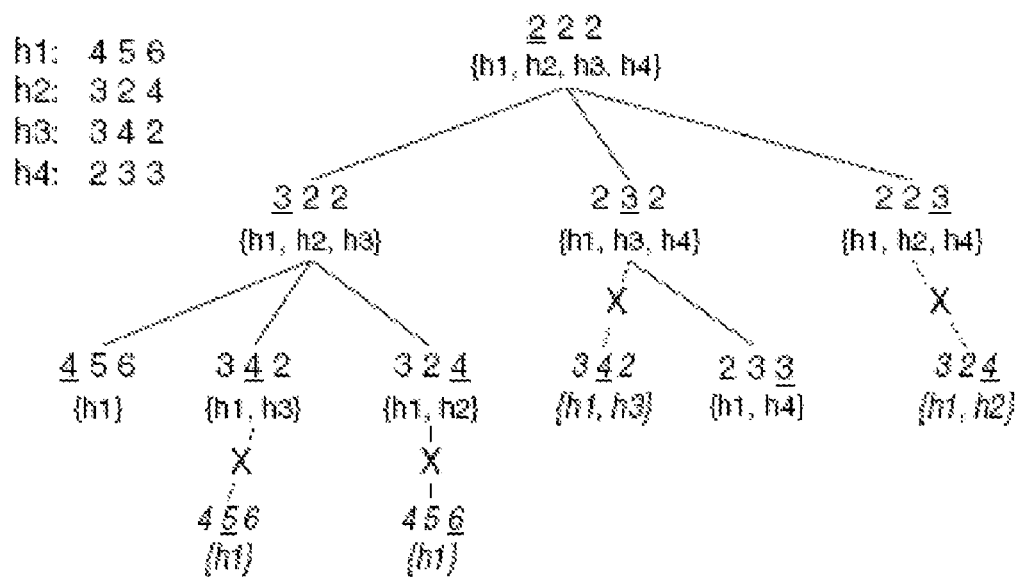
FIG. 8 illustrates a running example of ClosedVect according to the preferred embodiment of the present invention.

FIG. 8 shows a running example of the Algorithm ClosedVect. The underlined number denotes the beginning position b. Duplicate search states are pruned. For instance, the extension to "2 3 2" at position "3" leads to a supporting set "{h1, h3}", of which the floor is "$\overline{3}$ 4 2". This extension violates the search order and is pruned (lines 7-8 of the Algorithm ClosedVect).

An algorithm is complete if it finds all answers. It is compact if every search state finds at least one distinct answer. It is duplicate-free if it has no duplicate search states or duplicate answers. The following theorem shows the correctness and efficiency of the Algorithm ClosedVect (see [38] for proof).

Theorem 3. (Correctness and Efficiency of ClosedVect). The Algorithm ClosedVect explores closed and only closed sub-vectors. It is complete, compact, and duplicate-free.

In other words, the Algorithm ClosedVect is optimal in terms of the number of search states because every search state corresponds to a distinct closed sub-vector.

D Discovering Functional Modules by Repeated Random Walks on

Genome-scale protein interaction networks have become available in recent years due to high throughput methods for detecting protein-protein interactions. Studies that utilize additional indirect genomic data have provided probabilistic functional networks for a number of model organisms. However, a major and a computationally intensive challenge is the identification and extraction of functional modules from these massive genome-scale protein networks. In this paper, we propose an efficient algorithm based on repeated random walks on graphs for discovering functional modules, e.g., complexes and pathways, within such networks. We apply the proposed technique on a functional network of yeast genes and efficiently identify statistically significant clusters of proteins. We validate the biological significance of the results using known complexes in the MIPS complex catalogue database and with support from recent publications in the field. We also provide predictions for a number of proteins with unknown cellular function.

D.1 Introduction

Recent developments in life sciences have shown that the complex biological functions of higher organisms are due to combinatorial interactions between their proteins. Therefore, in recent years much effort has gone into finding the complete set of interacting proteins in an organism [69]. Genome-scale protein networks have been realized with the help of high throughput methods, like yeast-two-hybrid (Y2H) [52, 67] and affinity purification with mass spectrometry (APMS) [49, 50]. In addition, information integration techniques that utilize indirect genomic evidence have provided both increased genome coverage by predicting new interactions and more accurate associations with multiple supporting evidence [44, 53, 56, 68].

Complementary to the availability of genome-scale protein networks, various graph analysis techniques have been proposed to mine these networks for pathway discovery [40, 43, 51, 63, 65, 72], function assignment [54, 57, 66], and prediction of complex membership [41, 46]. Bader and Hogue [42] propose a clustering algorithm to detect densely connected regions in a protein interaction network for discovering new molecular complexes. Their algorithm, MCODE, uses vertex weighting based on neighborhood density and identifies the densest regions in a protein network. Scott et al. [65] present an algorithm based on color coding to find the best path of a specified length between two given proteins. In another study, Hu et al. propose an algorithm for finding coherent dense subgraphs that occur frequently on a large number of massive graphs [51]. They apply their technique on 39 different co-expression networks.

In this disclosure, we propose a novel and an efficient algorithm, repeated random walk (RRW), for pathway discovery within genome-scale protein interaction networks. The idea is based on expansion of a given cluster to include the protein with the highest proximity to that cluster. Starting with a cluster of size one (any protein in the network), this iterative process is repeated k times for obtaining clusters of size k. We use random walks with restarts to find the closest proteins to a given cluster. Unlike the other techniques proposed for pathway discovery, the random walk method implicitly exploits the global structure of a network by simulating the behavior of a random walker [58]. Google search engine uses a similar technique to exploit the global hyperlink structure of the Web and produce better rankings of search results [45]. Weston et al. [70] use the random walk technique on a protein sequence similarity graph created using PSI-BLAST scores to provide better rankings for a given query protein sequence.

We develop theoretical bounds for the change in the random walk results between two consecutive levels of the repeated random walk process. The bounds are used to minimize the expensive computation of a single random walk, and reduce the computational cost significantly. We apply RRW on a functional network of yeast genes and efficiently identify statistically significant clusters of proteins. We validate the biological significance of the results by comparison to known complexes in the MIPS complex catalogue database [60]. We show that the clusters discovered by RRW is supported by recent publications in related areas. We also provide predictions for a number of proteins with unknown cellular function.

In Section D.2, we give a formal description of the problem and we describe the proposed repeated random walk (RRW) algorithm; in Section D.2.4, we provide theoretical bounds for reducing computational complexity; and in Section D.3, we describe how the statistical significance of a cluster of proteins is assessed.

D.2 Problem Statement and Algorithm

Let G=(V, E) be the graph representing a genome scale protein interaction network, where V is the set of nodes (proteins), and E is the set of weighted undirected edges between pairs of proteins. The edges are weighted by the probability of interaction (or functional association).

D.2.1 Problem Definition

Given a physical protein interaction or predicted functional network of an organism, our goal is to find biologically significant groups of proteins in the network. Here, the definition of a biologically significant group entails proteins that function together in a biological pathway, are members of a protein complex, or have the same cellular function. In addition, significant clusters may contain proteins from different complexes, therefore reveal modular interactions at a higher level. (Assessment of statistical significance is discussed in detail in Section D.3.)

The problem can be stated formally as follows: Given an undirected weighted graph G=(V, E), find top-m connected clusters of vertices of size at most k where the ranking is based on statistical significance.

Evaluating all possible sets of proteins for biological significance is obviously intractable, $O(2^{|V|})$. Therefore, we propose a heuristic based on random walks on graphs. The idea is based on expansion of a given cluster to include the protein with the highest proximity to that cluster. Starting with a cluster of size one, this iterative process is repeated k times for obtaining clusters of size $\leq k$ (assuming all intermediate clusters are also assessed for biological significance).

D.2.2 Random. Walks with Restarts

We use random walks with restarts for finding the highest affinity protein to a given cluster. The random walk technique exploits the global structure of a network by simulating the behavior of a random walker [58]. The random walker starts on an initial node (or a set of source nodes simultaneously), and moves to a neighboring node based on the probabilities of the connecting edges. The random walker may also choose to teleport to the start nodes with a certain probability, called the restart probability, $\alpha$. The walking process is repeated at every time tick for a certain amount of time. At the end, the percentage of time spent on a node gives a notion of its proximity to the starting nodes. We refer to the stationary vector of the Markov chain as the affinity vector.

The restart probability $\alpha$ enforces a restriction on how far we want the random walker to get away from the starting nodes. In other words, if $\alpha$ is close to 1, the local structure around starting nodes is analyzed, and as $\alpha$ gets close to 0, a more global view is observed. We use $\alpha=0.6$ for the results reported in this paper. The idea of random walks with restarts is closely related to Google's PageRank algorithm [45] and RANKPROP of Weston et al. [70]. The Algorithm RandomWalk, set forth below, finds the j closest proteins to a set of proteins using random walks with restarts. A single designated node, $n_a$, is used for restarts. Note that, due to the directed edges (line 5 in the Algorithm RandomWalk) between $n_a$ and the starting nodes in C, a random walk starting from C is simulated. The main benefit of having a single restart node is the ease of tracking the perturbations in the transition matrix when the set of starting nodes C changes (see Section D.2.4). The complexity of the algorithm is $O(w \cdot |V|^2)$, where w is the number of iterations to converge. The value of w is determined by the structure of the network and the restart probability $\alpha$. (In general, the ratio of the first two eigenvalues of a transition matrix specifies the rate of convergence to the stationary probability [48]. Line 5 of the Algorithm RandomWalk needs to be rewritten in the form of x:=Qx for this analysis.)

| Algorithm RandomWalk |
|---|
| Input: similarity network G = (V, E);<br>    set of starting nodes C;<br>    restart probability $\alpha$;<br>    rank j;<br>Output: top j closest proteins to C;<br>  (1)    let $n_\alpha$ be a new vertex designated for restarts<br>  (2)    V := V ∪ {$n_\alpha$};<br>  (3)    for every n ∈ C<br>  (4)        let e be a directed edge {$n_\alpha \to n$} with a weight of $\frac{1}{|C|}$<br>  (5)    E := E ∪ {e};<br>  (6)    let s be the restart vector with 0 for all its entries except a 1 for the entry denoted by $n_\alpha$;<br>  (7)    let P be the column normalized adjacency (transition) matrix defined by G;<br>  (8)    initialize x := s;<br>  (9)    while (x has not converged)<br>  (10)      x := (1 − $\alpha$)Px + $\alpha$s:<br>  (11)    output the proteins denoted by the j largest entries in x except $n_\alpha$ |

D.2.3 Repeated Random Walk Algorithm

The Algorithm RandomWalk finds the top few proteins that are adjacent to a start node. We can add one of these proteins to the start set and repeat the random walk. Successive iterations can be used to identify clusters of any given size. Repeated random walks is based on this idea.

One can use the highest ranking protein each time for re-executing the Algorithm RandomWalk. However, this greedy expansion approach is sensitive to noise in the network. Studies on protein interaction networks [53, 69] show that large scale interaction experiments may contain many false positives and false negatives. A complex that should appear as a clique in the network rarely does so in practice. Therefore, for robustness, suboptimal choices, i.e., expansion of a cluster using a protein among the j closest proteins instead of using the closest protein, are needed to discover biologically significant clusters that may otherwise be overlooked.

| Algorithm RepeatedRandomWalk |
|---|
| Input:    similarity network G = (V, E);<br>           restart probability $\alpha$;<br>           branching factor j;<br>           maximum size of clusters k;<br>Output: top m, significant clusters in the network;<br>(1) let D be the set of found clusters;<br>(2) initialize D := { };<br>(3) for every n ∈ V<br>  (4)    let W be a priority queue of clusters to be expanded;<br>  (5)    initialize W :=empty priority queue;<br>  (6)    W .insert({n}); |

-continued

Algorithm RepeatedRandomWalk (7) while (W is not empty)
(8)     let C:=W.extractMin( );
(9)     let B:=RandomWalk(G,C,α,j);
(10)    for t:=1 to j
(11)        let c:=$B_t$;
(12)        let F:=C ∪ {c};
(13)        if (|F| ≤ k and F ∉ D)
(14)            D:=D ∪ F;
(15)            if (|F| < k)
(16)                W.insert(F);
(17)    end while
(18) compute the statistical significance of clusters in D;
(19) sort the clusters in D based on their significance;
(20) output top m significant clusters;

The Algorithm RepeatedRandomWalk, set forth above, shows the repeated random walk (RRW) algorithm for finding strongly connected clusters of proteins. Starting from every node in the network, sets of strongly connected proteins are found by expanding the clusters repeatedly using the Algorithm RandomWalk. Clusters of size ≤k are inserted into a priority queue ordered by their statistical significance, i.e., p-values. For expanding a cluster C, the Algorithm RandomWalk is run and top-j closest proteins are recorded. Each of the j neighbor proteins is added to C one by one resulting in j new clusters to be further expanded. The expansion process can be viewed as a tree with height k and branching factor j. The complexity, in the worst case, is exponential in the branching factor and the maximum cluster size, $O(|V| \cdot j^k \cdot R)$, where R is the complexity of the Algorithm RandomWalk. It is important to note that the bottleneck in the Algorithm RepeatedRandomWalk is the call to RandomWalk method which takes about a second on a protein network with |V|=4, 681 and |E|=34,000.

Figure 9:
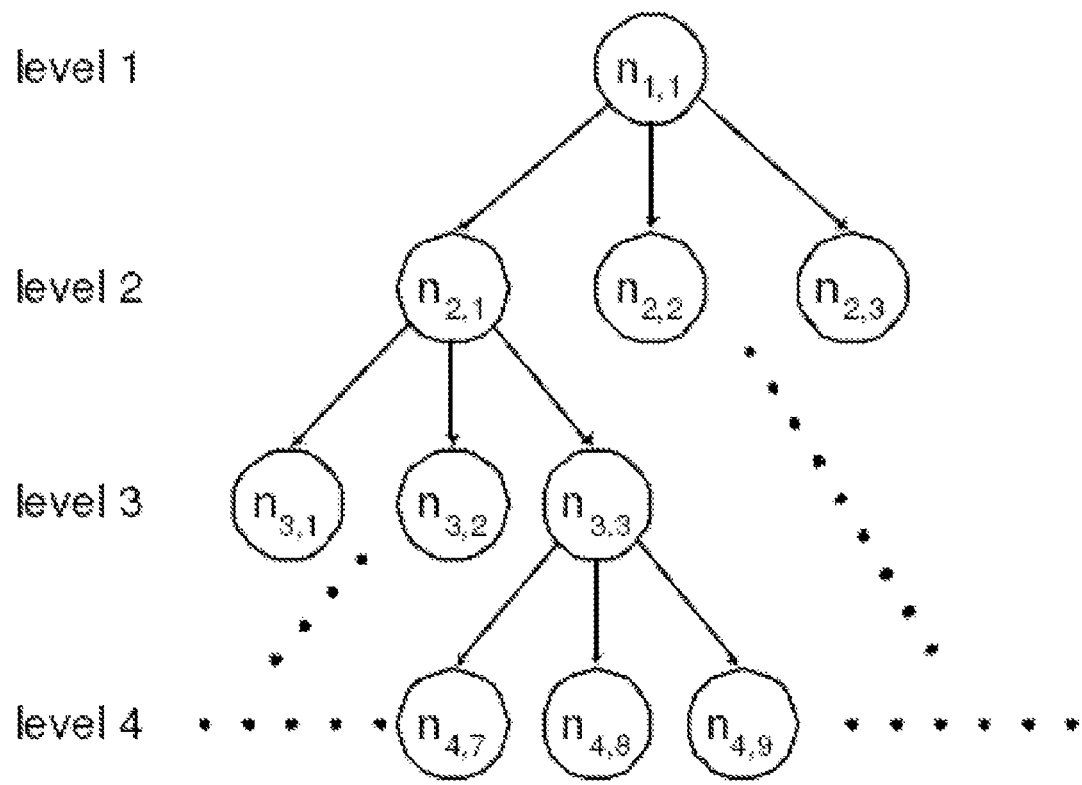
FIG. 9 illustrates repeated random walks starting from node $n_{1,1}$ with a branching factor of 3 and a maximum cluster size of 4.

FIG. 9 gives a graphical view of the expansion process starting from node $n_{1,1}$. The branching factor is 3 and the maximum size of clusters is 4. The nodes in the tree are labeled with subscripts indicating their level and their order in that level. All possible paths in the expansion tree are candidate clusters and are assessed for statistical significance. (The nodes in the path from the root node to an intermediate node constitutes a cluster). Note that, in general, a protein may appear more than once in the expansion tree (e.g., $n_{3,1}$ may represent the same protein as $n_{4,8}$). Therefore, a path may contain the same set of nodes as another path, in which case the expansion is omitted to avoid duplication (line 13 in the Algorithm RepeatedRandomWalk). In other words, the observed complexity of the algorithm may not be exponential in j based on the structure of the network. However, for large cluster sizes and branching factors, the computational requirements of the algorithm is such that it may take days to run on a yeast interaction network with ~4,500 proteins and ~35,000 interactions. Running the Algorithm RandomWalk at each level of expansion is computationally very expensive. In order to reduce this complexity, one can use the best neighbors based on edge weights. However, this naive nearest neighbor approach does not capture the structure of the network around starting nodes [46, 70]. As another alternative to reduce the running time, one may consider starting from a select number of nodes, e.g., the nodes adjacent to strongest edges in the network, instead of all the nodes in the network. However, this strategy is likely to miss significant clique like clusters that have weaker pairwise interactions. In order to reduce computational complexity without sacrificing recall, we develop bounds in the next section on the change of affinity of a node. This allows us to predict the expansion of a cluster without executing RandomWalk in line 9 of Algorithm RepeatedRandom Walk.

D.2.4 Using Theoretical Bounds to Speed Up Cluster Expansion

In this section, we analyze the change in the affinity of a node between two consecutive levels of expansion, i.e., levels i and i+1 in the expansion free (see FIG. 9). In order to expand a cluster at level i, the Algorithm RandomWalk is executed for finding the j closest proteins and form j new expanded clusters. We want to avoid the computational cost of Algorithm Random Walk, which is the bottleneck in the Algorithm RepeatedRandomWalk, to be able to analyze genome-scale protein networks in a reasonable amount of time. The execution of Algorithm RandomWalk can be avoided, when we are confident that the ranking of the next closest node does not change at level i+1. Let R denote the ranking of proteins at an expansion node at level i. If the difference in the affinity values of the (j+1)th and $(j+2)^{th}$ protein in R is larger than the sum of affinity gain of the $(j+2)^{th}$ protein and affinity loss of the $(j+1)^{th}$ protein, then the $(j+1)^{th}$ protein in R is guaranteed to appear among the j best proteins at level i+1 of the expansion. Our goal is to develop a theoretical bound for the net affinity change of two consecutive nodes in ranking R between two consecutive expansion levels and, therefore minimize the expensive invocations of the Algorithm Random Walk.

Figure 10:
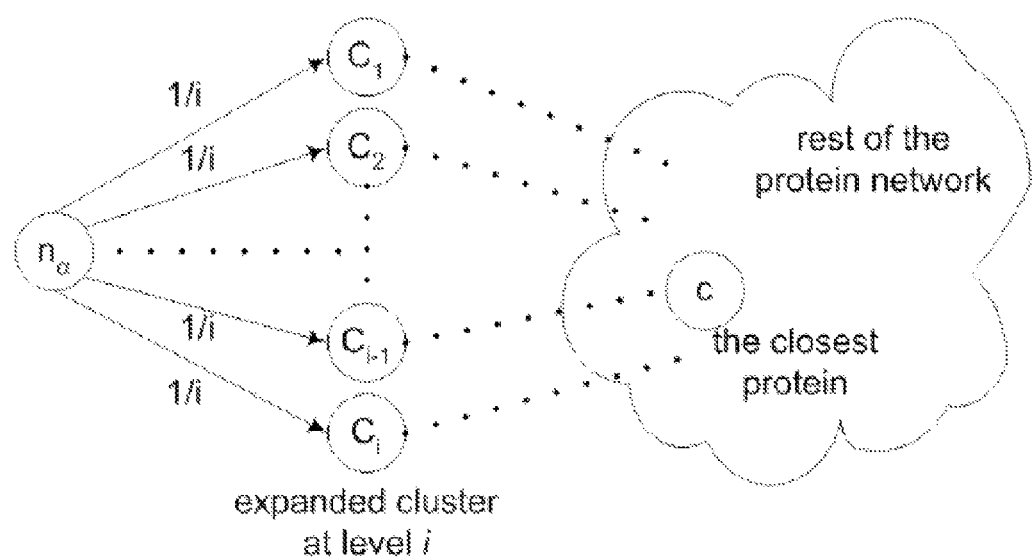
FIG. 10 shows a modified network structure at two consecutive expansion levels, wherein a single designated node, $n_a$, is used for restarts.
Figure 10:
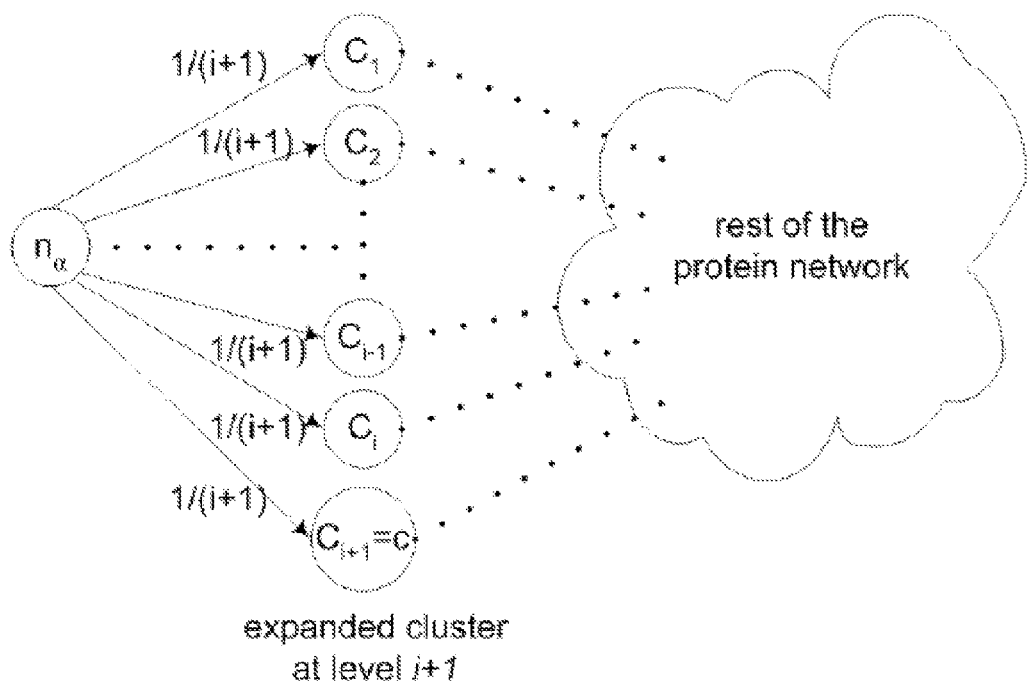

In FIG. 10, two protein networks at expansion levels i and i+1 are shown. At expansion level i+1 of the repeated random walk, one of nodes from the "rest of the network", c, is added to the set of starting nodes. The only change in the transition matrix to reflect addition of c is the insertion of a directed edge from $n_a$ to c with a weight of $$\frac{1}{(i+1)}$$

and the decrease in the edge weights for the nodes in C. The total perturbation in weights amounts to $$i \cdot \left(\frac{1}{i} - \frac{1}{i+1}\right) + \frac{1}{(i+1)} = \frac{2}{(i+1)}.$$

The restart vector, s, is constant at every expansion level.

Theorem 4. The $L_1$ distance between the affinity vectors computed at two consecutive expansion levels is bounded by $$\frac{4}{i+1},$$

i.e., $$\|x_i - x_{i+1}\|_1 \leq \frac{4}{i+1} \qquad (1)$$

We use the idea of coupled Markov chains to prove a bound on the change in the affinity vector. The proof is similar to that constructed by Ng et al. to examine the PageRank algorithm [61].

Proof. We construct a coupled Markov chain $\{(X_t, Y_t): t \geq 0\}$ over pairs of protein nodes as follows. We start our random walker at $n_a$ in both chains, i.e., $X_0=Y_0=n_a$. The following state transitions work as follows: On step t, we decide with probability $\alpha$ to "reset" both chains, in which case we set $X_t$ and $Y_t$ to $n_a$. If no "reset" occurs, and if $X_{t-1}=Y_{t-1}$ and $X_{t-1} \neq n_a$, then the next steps of the two Markov processes are coupled, i.e., $X_t=$ and X, is a random protein interacting with the protein $X_{t-1}$. In all other cases, $X_t$ is chosen to be a random protein interacting with protein and independently of it, $Y_t$ is chosen to be a random protein interacting with protein $Y_{t-1}$. Note that $X_t=n_a$ iff $Y_t=n_a$.

We now have two "coupled" Markov chains $X_t$ and $Y_t$ with correlated transitions. However, there is a subtle difference in their transition matrices that results in different affinity (stationary) vectors $x_i$ and $x_{i+1}$. Now, let $d_t=P(X_t \neq Y_t)$. Note that $d_0=0$, since $X_0=Y_0$. We have:

$$d_{t+1} = P(X_{t+1} \neq Y_{t+1} \mid X_t = Y_t = n_a) \cdot P(X_t = Y_t = n_a) +$$
$$P(X_{t+1} \neq Y_{t+1} \mid \neg (X_t = Y_t = n_a)) \cdot P(\neg (X_t = Y_t = n_a))$$
$$= \alpha \cdot P(X_{t+1} \neq Y_{t+1} \mid X_t = Y_t = n_a) +$$
$$P(X_{t+1} \neq Y_{t+1}, X_t = Y_t \mid \neg (X_t = Y_t = n_a)) \cdot (1 - \alpha) +$$
$$P(X_{t+1} \neq Y_{t+1}, X_t \neq Y_t \mid \neg (X_t = Y_t = n_a)) \cdot (1 - \alpha) \leq$$
$$\alpha \cdot P(X_{t+1} \neq Y_{t+1} \mid X_t = Y_t = n_a) + P(X_t \neq Y_t) \cdot (1 - \alpha)$$

$$d_{t+1} \leq \alpha \frac{2}{(i+1)} + (1-\alpha) d_t$$

The second sum term in the second equation is 0, because when $X_t$ and $Y_t$ are equal and different from $n_a$, $X_{t+1}$ and $Y_{t+1}$ should be equal because all the nodes except $n_a$ are unperturbed. The first sum term in the first inequality is $$\alpha \cdot \frac{2}{(i+1)},$$

because the probability that $X_{t+1}$ is different from $Y_{t+1}$ when both $X_t$ and $Y_t$ are $n_a$ is given by the total perturbation which amounts to $$\frac{2}{(i+1)}$$

(see FIG. 9). Solving the recurrence relation with the initial value d0=0, we get $$d_\infty \leq \frac{2\alpha}{(i+1)\alpha} = \frac{2}{(i+1)}.$$

By the Coupling Lemma [39], the variational distance ($\frac{1}{2}$) $\Sigma_k |x_{i,k}-x_{i+1,k}|$ must also be bounded by the same quantity $d_\infty$. Therefore, $\|x_i-x_{i+1}\|_1 \leq 2 d_\infty$, which concludes the proof.

Figure 11:
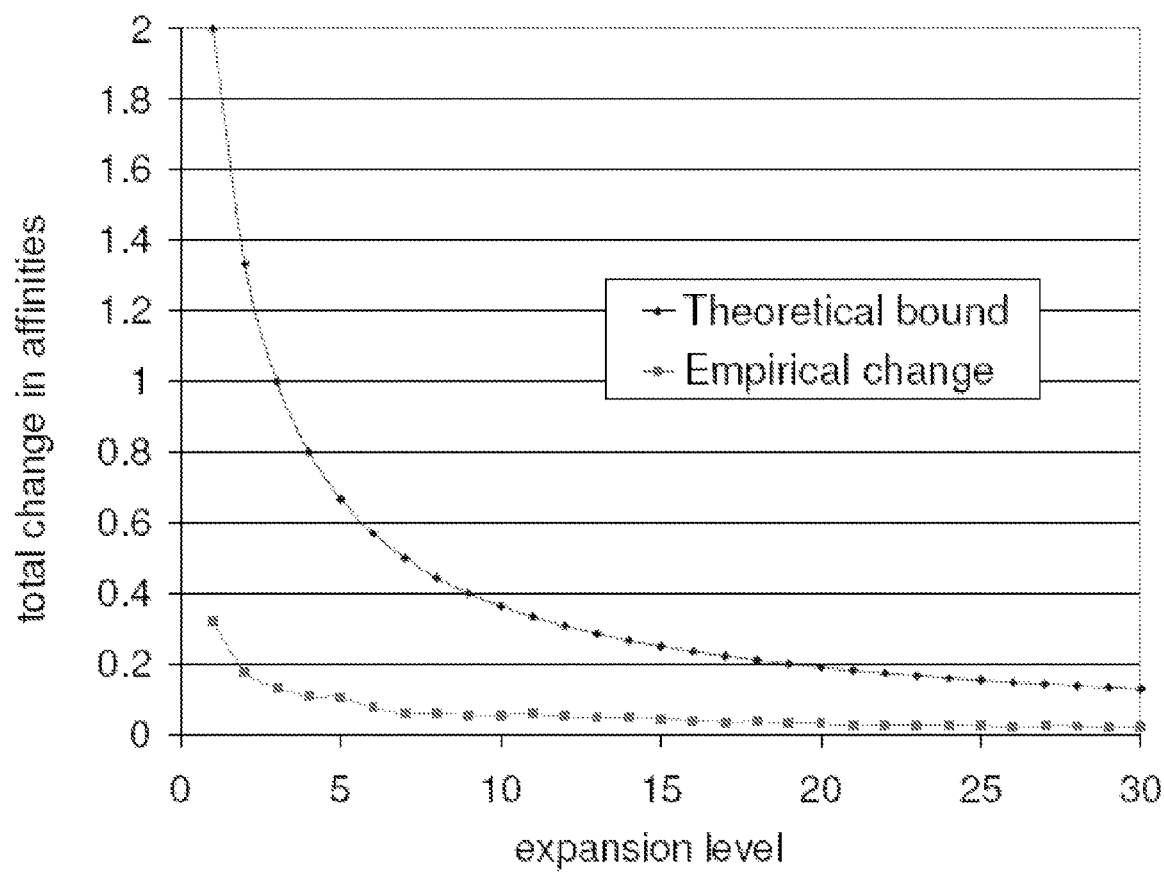
FIG. 11 is a graph of theoretical versus empirical change in the affinity vectors of consecutive expansion levels.

FIG. 11 shows the theoretical bounds in the total change of affinities along with the observed total changes on the yeast network ConfidentNet [18]. Note that the predicted bounds are always higher than the observed bound.

Figure 12:
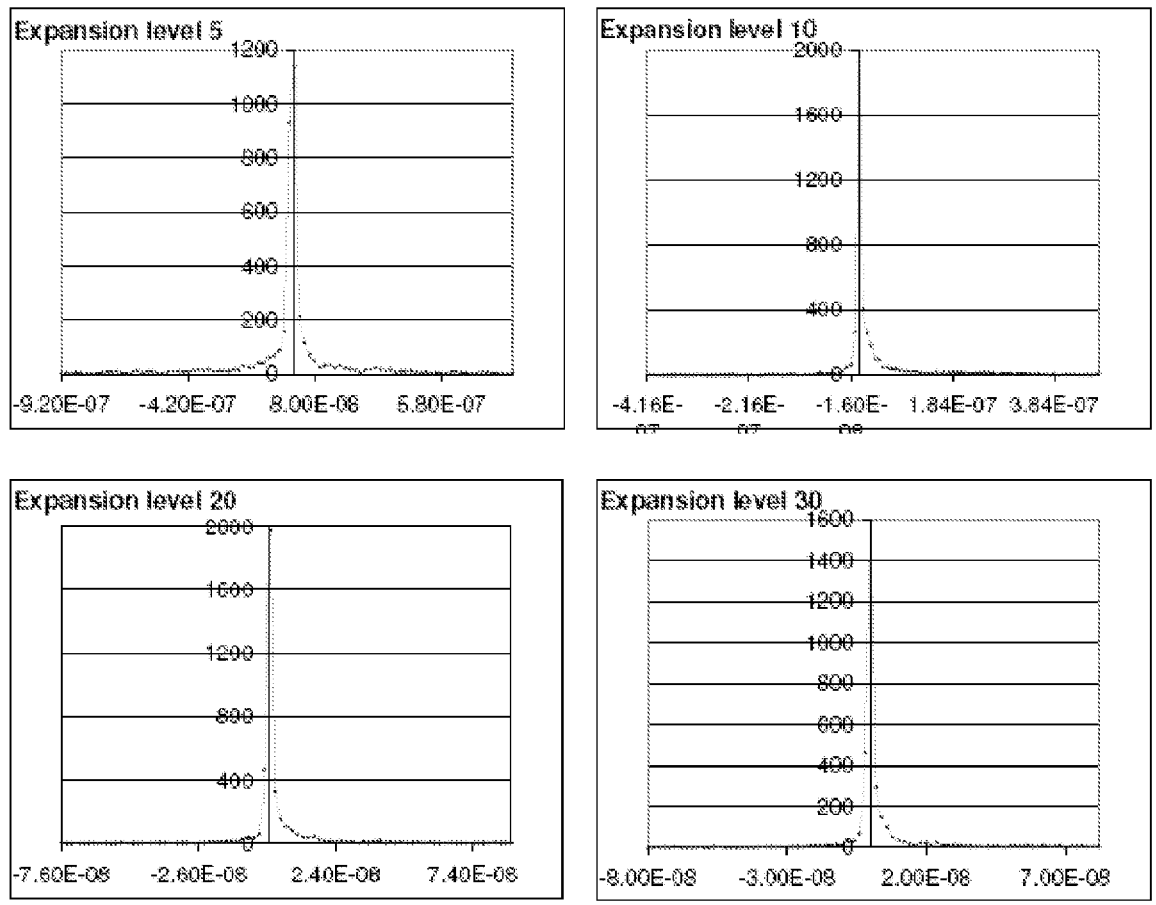
FIG. 12 are graphs of distributions of changes in the affinities of nodes between two consecutive expansion levels for i=5, 10, 20, and 30.

Theorem 4 gives a bound on the total change in the affinities of all the nodes in the network between consecutive expansions of a cluster. However, in order to check for rank changes, we need element-wise bounds on the affinity values. Of course, the total bound of 4/(i+1) also holds for the change on the affinity of each node. But, in our experiments on Lee et al.'s ConfidentNet [18], the total bound is too large compared to affinity differences between two consecutive nodes in the ranking, i.e., the total bound is too loose to guarantee the same rank order. Therefore, we need tighter bounds to be able to avoid costly invocations of the Algorithm RandomWalk. To achieve this goal, we analyzed the distributions of element-wise changes at different expansion levels. FIG. 12 shows a number of such distributions. It is evident from the figure that a large number of nodes have very small changes in their affinities while a small number of nodes have greater changes. The observed element-wise changes are significantly smaller than the theoretical total bound and can be modeled with narrow Gaussian distributions centered at 0.

We model the change in affinities between levels i and i+1 by a Gaussian distribution $N(\mu, \sigma)$. A conservative estimate of the mean $\mu$ of the distribution is given by Theorem 4 as $$\frac{4}{(i+1) \cdot |V|}.$$

The standard deviation $\sigma$ is obtained using the element-wise affinity changes from level i−1 to level i. The affinity changes from level i to level i+1 are assumed to follow the distribution $$N\left(\frac{4}{(i+1) \cdot |V|}, \sigma\right).$$

Using the assumed distribution, we compute the following probability:

$$P(\Delta x_{j+1} + \Delta x_{j+2} < x_{j+1} - x_{j+2}) \quad (2)$$

where $x_j+1$ is the affinity of the $(j+1)^{th}$ closest protein at expansion level i and $\Delta x_{j+1}$ is the change in the affinity of that protein at expansion level i+1. Note that j is the branching factor and is constant at all expansion levels. The computed probability provides a measure of confidence on a $(j+1)^{th}$ protein's inclusion in the next expansion level. The call to RandomWalk is avoided when the confidence level is above a certain threshold. We use 0.95 as the threshold in our experiments. The same check is performed for consequent levels of expansion, e.g., (i+2), (i+3), and so on, and execution of RandomWalk is delayed until the ranking is likely to change. Using the developed bounds and pruning the call to Random-Walk method, we reduce the computational cost greatly, as demonstrated in Section D.4.

D.3 Statistical Significance of a Cluster

Figure 13:
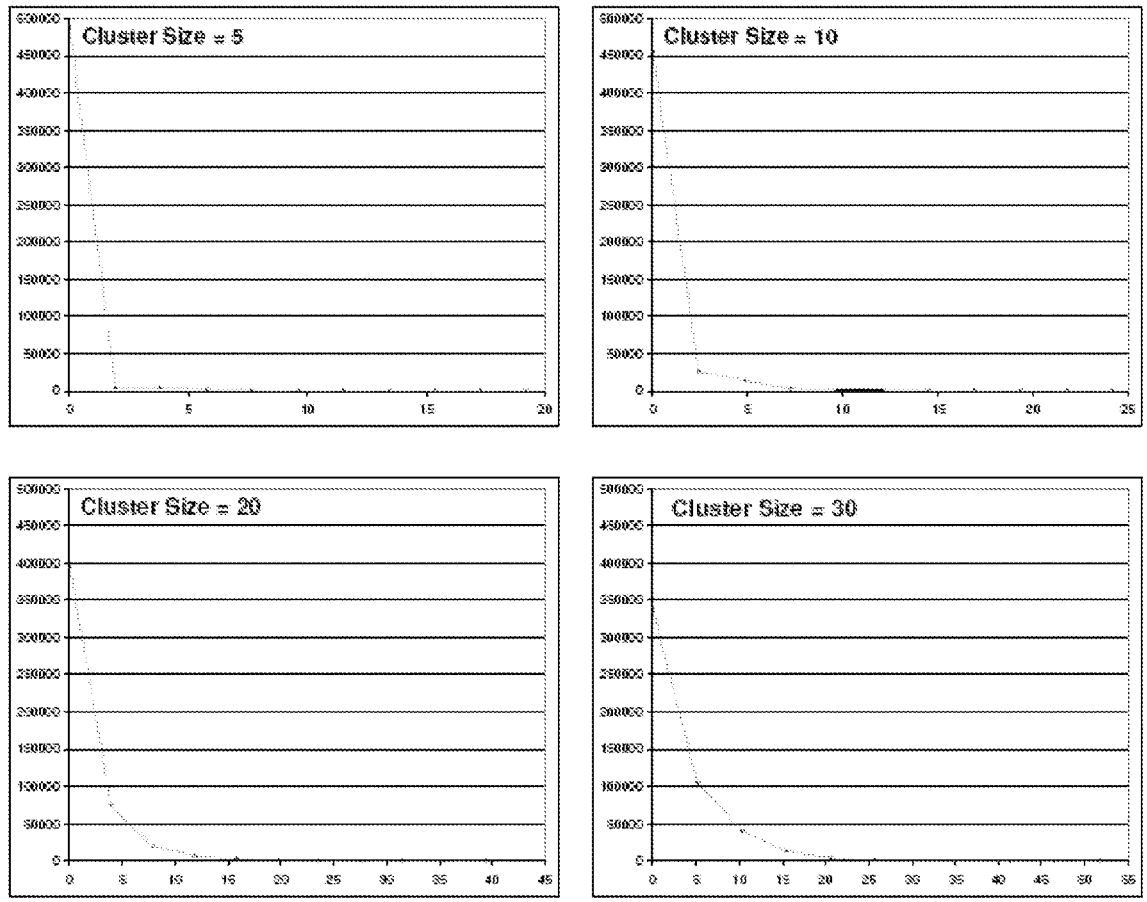
FIG. 13 are histograms of maximum spanning tree weights for clusters of size k=5, 10, 20, and 30.

Given a set of proteins that form a cluster in a genome-scale protein network, we assign a statistical significance to that set based on its deviation from a random set of the same size chosen from the same network. As a quantitative representation of a cluster, we use the weight of its maximum spanning tree. We analyze the background distribution of weights of maximum spanning trees of a certain size k by uniformly sampling large number of sets of size k from the network. FIG. 13 shows a number of background distributions for clusters of size 5, 10, 20, and 30. The graphs show histograms of maximum spanning tree weights for 500K randomly selected clusters from the functional yeast network, ConfidentNet [18], used in our experiments. The y-axis in the graphs shows the count of proteins that falls into a certain bin of maximum spanning tree weight (x-axis). We fit standard exponential distributions to histograms of different cluster sizes, e.g., $\lambda 20=0.36$ for cluster size 20 and $\lambda 5=1.7$ for cluster size 5. The statistical significance, p-value, of a cluster of size k with a maximum spanning tree weight of w is then given by:

$$P(x \geq w) = e^{-\lambda k w} \quad (3)$$

which is the probability of a random cluster to have a maximum spanning tree weight greater than or equal to w. The p-value scoring scheme provides a mechanism to compare clusters of different sizes. We show in our experiments that statistically significant clusters usually correspond to biologically significant clusters.

E Logical Flow

Figure 14:
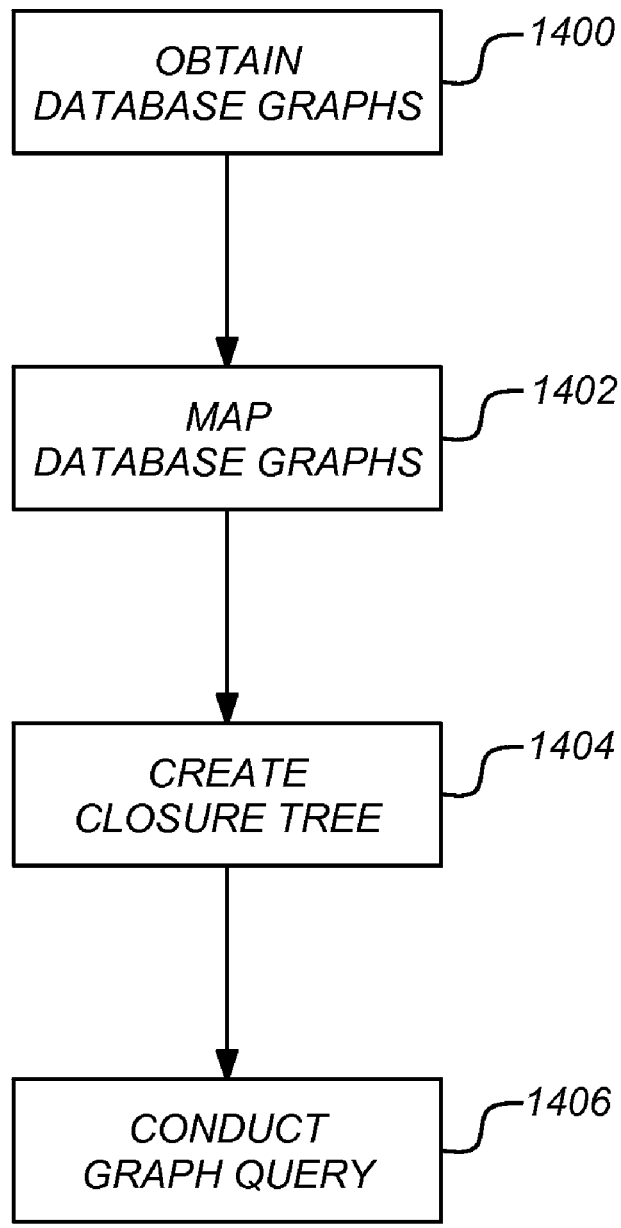
FIG. 14 illustrates the logical flow for conducting a database graph query in accordance with one or more embodiments of the invention.

FIG. 14 illustrates the logical flow for conducting a database graph query in accordance with one or more embodiments of the invention. At step 1400, a first and second database graph are obtained. The two graphs each have two or more vertices and one or more edges.

At step 1402, first database graph is mapped to the second database graph. During the mapping, each vertex and edge in the first graph has a corresponding vertex and edge in the second graph. To ensure such a correspondence, the mapping may include extending the first graph by creating dummy vertices and dummy edges wherein every vertex and every edge of the first graph (including the dummy vertices and edges) has a corresponding element in the second graph.

The mapping may also include the construction of a bipartite graph between the two graphs. In such a bipartite graph, a first partition contains vertices from the first graph and the second partition contains vertices from the second graph. Edges of the bipartite graph are formed by connecting the vertices from the two graphs. Once the edges and vertices are established, the mapping is defined as a maximum similarity for each edge and vertex.

In alternate embodiments, the mapping biases neighbors of similar vertices. In other words, the mapping biases the matching of vertices towards neighbors of already matched vertices (i.e., even if two vertices have been unmatched). TO establish such a bias, an initial similarity matrix is computed for the first graph and the second graph. Each entry of the similarity matrix represents a weight similarity of each vertex of the first graph to each vertex of the second graph. A priority queue is then created that includes vertex pairs based on the weight similarity. Each vertex pair has a vertex from the first graph and a most similar vertex from the second graph (based on the weight similarity). The priority queue is then processed by marking a first vertex pair in the queue as "matched". A higher similarity weight is assigned to unmatched vertex pairs that are neighbors to the first vertex pair. The marking and assigning steps are repeated for each vertex pair in the priority queue until all vertices in the first graph have been marked as "matched".

At step 1404, a graph closure tree is created. A closure tree is a union of the first graph and the second graph based on the mapping. Each node of the graph closure tree is a graph closure of the node's children and each child of a leaf node is a database graph. The graph closure tree may also consists of a set of closure vertices and a set of closure edges. Each vertex in the set of closed vertices is a union of attribute values of each vertex from the first graph and the corresponding (i.e., mapped) vertex of the second graph. Similarly, each edge in the set of closure edges is a union of attribute values of each edge of the first graph and each corresponding (i.e., mapped) edge of the second graph.

At step 1406, a graph query is conducted based on the graph closure tree. Such a graph query may consists of a subgraph query. The subgraph query may also determine if a subgraph is subisomorphic. In such a subisomorphic determination, a level-n adjacent subgraph is defined for each vertex u of the first graph G1. The level-n adjacent subgraph contains all vertices reachable from the vertex u within a distance of n. A bipartite graph B may then be constructed for G1 and the second graph G2. Vertex sets of the graph B are vertex sets of G1 and G2. Further, for any two vertices u ∈G1, v ∈G2, if u is level-n pseudo compatible to v, then (u,v) comprises an edge of B, wherein vertex u is called level-n pseudo compatible to v if a level-n adjacent subgraph of u is level-n sub-isomorphic to that of v, wherein G1 is called level-n sub-isomorphic if every vertex in G1 is matched to a vertex in G2.

The subgraph query may be further expedited by pruning nodes of the graph closure tree based on the subgraph isomorphism. In such an embodiment, each level-n sub-isomorphic subgraph may then be verified for exact subgraph isomorphism.

Figure 15:
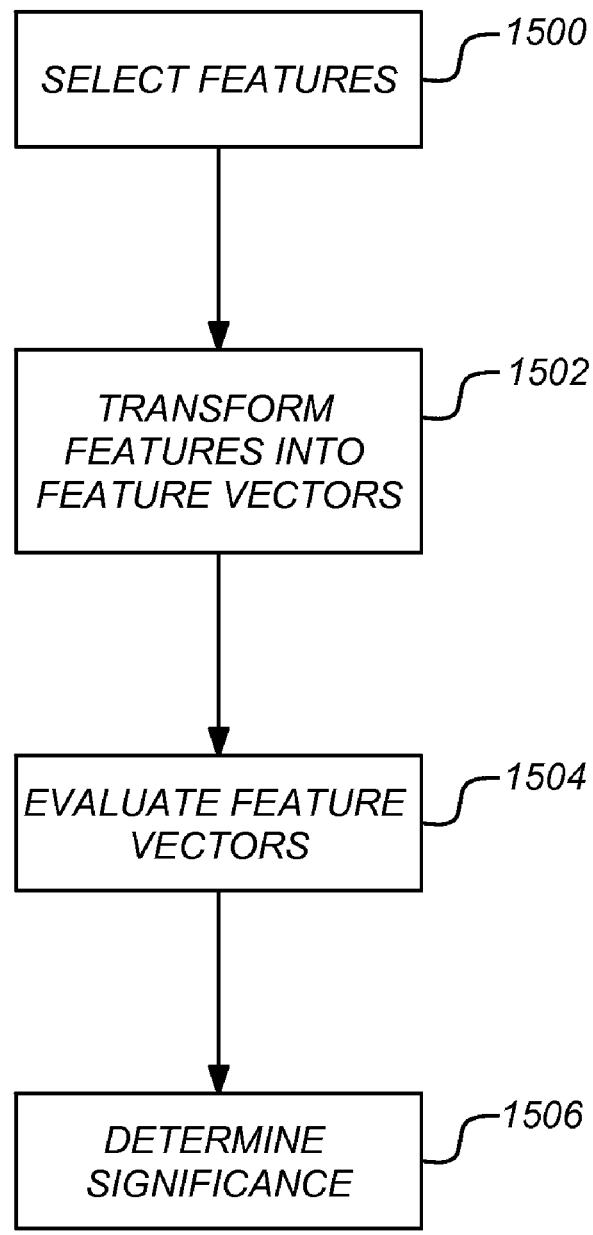
FIG. 15 is a flowchart illustrating the logical flow for determining a significance of frequent subgraphs is a database graph in accordance with one or more embodiments of the invention.

FIG. 15 is a flowchart illustrating the logical flow for determining a significance of frequent subgraphs is a database graph in accordance with one or more embodiments of the invention. At step 1500, one or more vertices or edges of a database graph are selected as features. Such a selection may be based on various properties. For example, the selection may be based on a frequency that a vertex or edge occurs in the database graph, a size of a vertex or edge in the graph, a structural overlap between vertices and/or edges in the graph, or the co-occurrence of vertices and/or edges in the graph.

At step 1502, the selected features are transformed into feature vectors. Each feature vector is a frequency of the selected feature in the database graph.

At step 1504, the feature vectors are evaluated. At step 1505, the statistical significance of the feature vectors are determined based on the evaluating.

The evaluation of step 1504 may model the probability that the selected features occur in a random vector through statistical observations. Such a random vector may be further constrained by a size of the random vector. Alternatively, the evaluating may explore closed sub-vectors of the feature vectors. Such exploring evaluates sets of closed vectors in a defined order and prunes duplicate sets during the evaluation. Further, to determine the statistical significance of the feature vectors, the statistical significance of each closed sub-vector that is not within a pruned duplicate set is evaluated.

Figure 16:
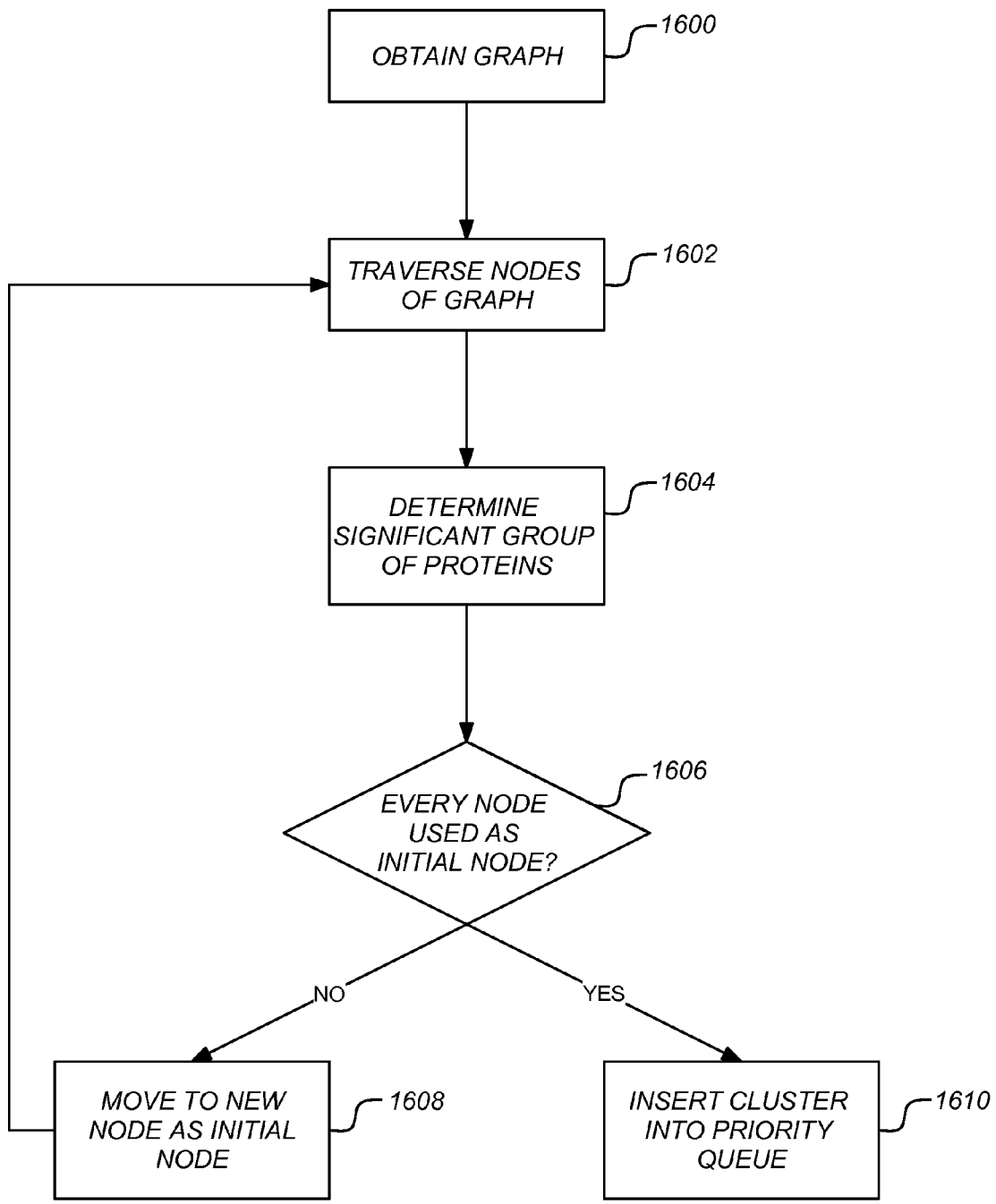
FIG. 16 is a flowchart illustrating the logical flow for finding a significant group of proteins in a genome scale interaction network in accordance with one or more embodiments of the invention.

FIG. 16 is a flowchart illustrating the logical flow for finding a significant group of proteins in a genome scale interaction network in accordance with one or more embodiments of the invention.

At step 1600, a graph G=(V,E) representing a genome scale protein interaction network is obtained. V is a set of nodes/proteins in the graph and E is a set of weighted undirected edges between pairs of nodes/proteins, wherein the edges are weighted by a probability of interaction.

At steps 1602, the nodes V are traversed. Beginning on an initial node, the traversal entails moving to a neighboring node based on the weight of connecting edges. The traversal moves to a new neighboring node based on the weight of connecting edges at every time tick for a defined period of time. Further, the traversal entails teleporting to the initial node and repeating the traversal based on a restart probability α. The traversal records each time a node is visited. At step 1604, a significant group of proteins is determined based on a proximity of a node to the initial node, wherein the proximity is based on a percentage of time spent on the node during the traversal.

At steps 1606 a determination is made regarding whether every node in the graph has been used as an initial node in a traversal. If not, the traversal begins at a new node at step 1608 and the traversing and determining steps 1602 and 1604 are repeated until every node is used as an initial node. Once all of the nodes have been used as initial nodes and traversed, the proteins (or cluster of proteins) are inserted into the priority queue based on a statistical significance of each cluster at step 1610.

Also of note is that the insertion of the nodes/proteins into the cluster may involve reordering the proteins in the priority queue. Such a reordering may consume significant time. Accordingly, in one or more embodiments, a current order of the cluster of proteins in the priority queue is not processed for reordering upon insertion of the cluster of proteins into the priority queue. In such an embodiment, the reordering does not occur until a confidence level, that the current order in the priority queue will change, is above a defined threshold. Such a confidence level is based on a probability or reordering that is based on a Gaussian distribution $$N\left(\frac{4}{(i+1)|V|}, \sigma\right),$$

wherein $$\frac{4}{(i+1)|V|}$$

comprises an estimated mean of distribution and σ is obtained using an element wise affinity change from levels i−1 to level i of the priority queue.

F Hardware and Software Environment

Figure 17:
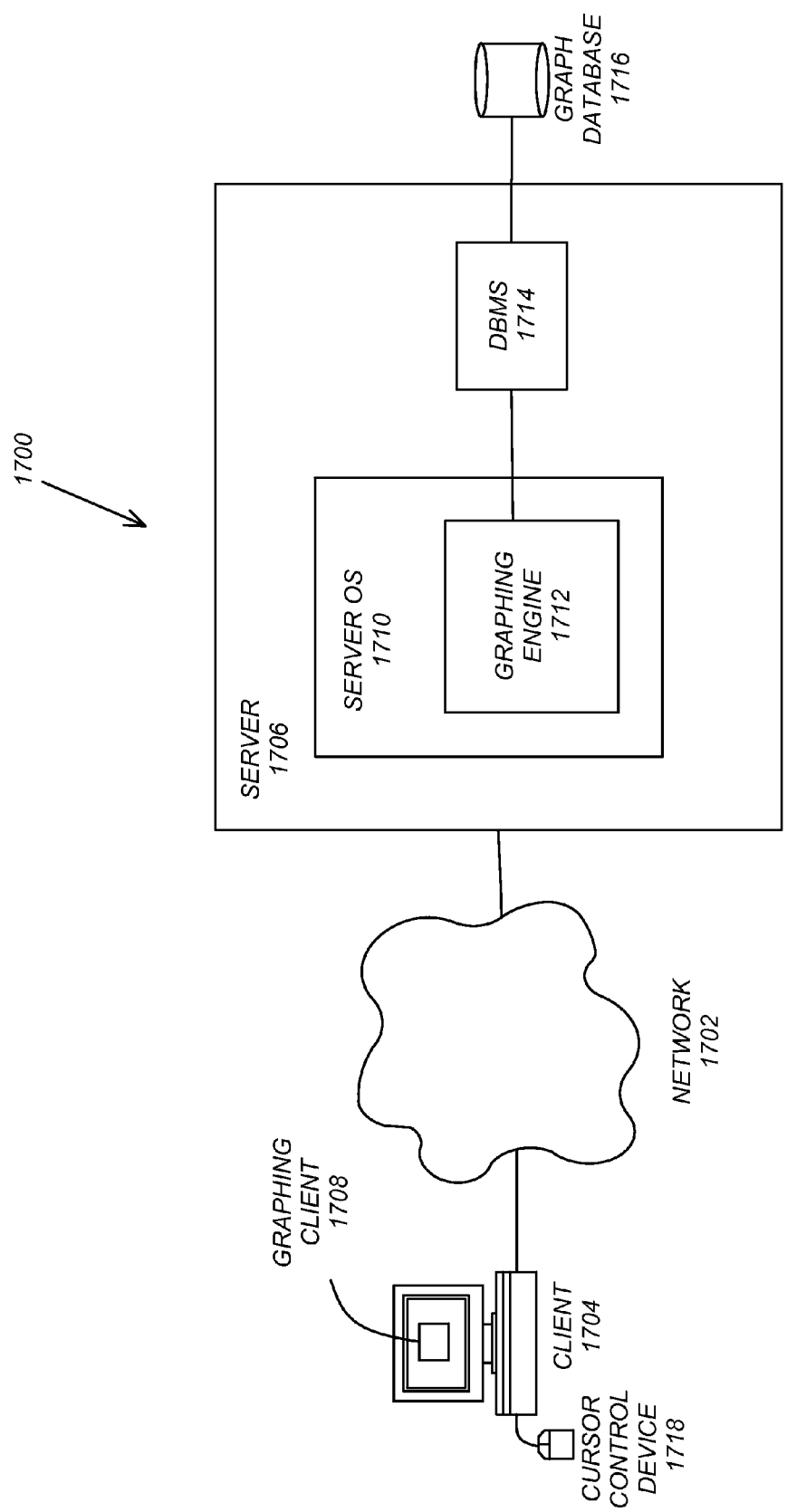
FIG. 17 schematically illustrates a hardware and software environment in accordance with one or more embodiments of the invention.

FIG. 17 schematically illustrates a hardware and software environment in accordance with one or more embodiments of the invention, and more particularly, illustrates a typical distributed computer system 1700 using a network 1702 to connect one or more client computers 1704 to one or more server computers 1706. A typical combination of resources may include a network 1702 comprising the Internet, LANs, WANs, SNA networks, or the like, clients 1704 that are personal computers or workstations, and servers 1706 that are personal computers, workstations, minicomputers, or mainframes. Additionally, both client 1704 and server 1706 may receive input (e.g., cursor location input) and display a cursor in response to an input device such as cursor control device 1718.

In one or more embodiments of the invention, the client 1704 may execute a graph visualization application 1708, which performs some or all of the logic described herein, and which communicates with one or more server computers 1706. The server computers 1706, in turn, each execute under the control of a server operating system (OS) 1710. In addition, the server computers 1706 may execute a graph querying and mining application 1712, which performs some or all of the logic described herein. The graph querying and mining application 1712 may access and/or manipulate data stored in a graph database 1716 by means of a database management system (DBMS) 1714.

Generally, these components 1708, 1710 1712, 1714 and 1716 comprise instructions and/or data that is embodied in or retrievable from device, medium, signal, or carrier, e.g., a data storage device, a data communications device, a remote computer or device coupled to the computer 1704, 1706 via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

G References

The following references are incorporated by reference herein:

[1] S. Berretti, A. D. Bimbo, and E. Vicario. Efficient matching and indexing of graph models in content-based retrieval. In IEEE Trans. on Pattern Analysis and Machine Intelligence, volume 23, 2001.

[2] E. Rahm and P. Bernstein. A survey of approaches to automatic schema matching. VLDB J. 10(4): 334-350 (2001).

[3] J. Lee, J. Oh, and S. Hwang. STRG-index: Spatio-temporal region graph indexing for large video databases. In SIGMOD Conference, 2005.

[4] KEGG. http://www.genome.ad.jp/kegg/.

[5] National Cancer Institute. http://dtp.nci.nih.gov/.

[6] H. Berman et al. The protein data bank. Nucleic Acids Research, (28):235-242, 2000.

[7] S. White and P. Smyth. Algorithms for estimating relative importance in networks. In Proc. SIGKDD, 2003.

[8] Gene Ontology. http://www.geneontology.org/.

[9] MeSH. http://www.nlm.nih.gov/mesh/.

[10] D. Shasha, J. T. L. Wang, and R. Giugno. Algorithmics and applications of tree and graph searching. 2002.

[11] X. Yan, P. S. Yu, and J. Han. Graph indexing: A frequent structure-based approach. In SIGMOD Conference, 2004.

[12] X. Yan, P. S. Yu, and J. Han. Substructure similarity search in graph databases. In SIGMOD Conference, 2005.

[13] P. Ciaccia, M. Patella, and P. Zezula. M-tree: An efficient access method for similarity search in metric spaces. In Proc. of VLDB, 1997.

[14] A. Guttman. R-trees: A dynamic index structure for spatial searching. In Proc. of SIGMOD, 1984.

[15] N. Beckmann, H.-P. Kriegel, R. Schneider, and B. Seeger. The R*tree: An efficient and robust access method for points and rectangles. In SIGMOD Conference, 1990.

[16] J. Hoperoft and R. Karp. An $n^{5/2}$ algorithm for maximum matchings in bipartite graphs. SIAM J. Computing, 1973.

[17] H. W. Kuhn. The hungarian method for the assignment problem. Naval Research Logistics Quarterly, 1955.

[18] C. H. Papadimitriou and K. Steiglit. Combinatorial optimization: algorithms and complexity, pages 247-255. 1982.

[19] M. Heymans and A. K. Singh. Deriving phylogenetic trees from the similarity analysis of metabolic pathways. Bioinformatics, 19, 2003.

[20] C. Faloutsos and K.-I. Lin. Fastmap: A fast algorithm for indexing, data-mining and visualization of traditional and multimedia datasets. In SIGMOD Conference, 1995.

[21] J. Han and M. Kamber. Data Mining: Concepts and Techniques. Morgan Kaufmann Publishers, 2000.

[22] J. R. Ullmann. An algorithm for subgraph isomorphism. Journal of the ACM, 1976.

[23] G. R. Hjaltason and H. Samet. Ranking in spatial databases. In Proc. 4th Int. Symposium on Large Spatial Databases (SSD '95), pages 83-95, 1995.

[24] T. Seidl and H.-P. Kriegel. Optimal multi-step k-nearest neighbor search. In SIGMOD Conference, 1998.

[25] M. Kuramochi and G. Karypis. Frequent subgraph discovery. In Proc. of ICDM, 2001.

[26] J. Hu, X. Shen, Y. Shao, C. Bystroff, and M. J. Zaki. Mining protein contact maps. In BIOKDD, 2002.

[27] R. Sharan, S. Suthram, R. M. Kelley, T. Kuhn, S. McCuine, P. Uetz, T. Sittler, R. M. Karp, and T. Ideker. Conserved patterns of protein interaction in multiple species. In Proc Natl Acad Sci, 2005.

[28] S. Kramer, L. D. Raedt, and C. Helma. Molecular feature mining in HIV data. In KDD, 2001.

[29] A. Inokuchi, T. Washio, and H. Motoda. An apriori-based algorithm for mining frequent substructures from graph data. In Principles of Data Mining and Knowledge Discovery, pages 13-23, 2000.

[30] X. Yan and J. Han. gSpan: Graph-based substructure pattern mining. In ICDM, 2002.

[31] X. Yan and J. Han. CloseGraph: Mining closed frequent graph patterns. In KDD, 2003.

[32] J. Huan, W. Wang, and J. Prins. Efficient mining of frequent subgraph in the presence of isomorphism. In ICDM, 2003.

[33] J. Huan, W. Wang, J. Prins, and J. Yang. SPIN: Mining maximal frequent subgraphs from graph databases. In KDD, 2004.

[34] N. Vanetik, E. Gudes, and S. E. Shimony. Computing frequent graph patterns from semistructured data. In Proceedings of ICDM, 2002.

[35] N. Vanetik and E. Gudes. Mining frequent labeled and partially labeled graph patterns. In ICDE, 2004.

[36] R. Milo, S. Shen-Orr, S. Itzkovitz, N. Kashtan, D. Chklovskii, and U. Alon. Network motifs: Simple building blocks of complex networks. Science, October 2002.

[37] S. Theodoridis and K. Koutroumbas. Pattern Recognition, chapter 5, pages 181-183. Academic press, second edition, 2003.

[38] Huahai He and Ambuj K. Singh. GraphRank: Statistical modeling and mining of significant subgraphs in the feature space. Technical report, department of computer science, University of California at Santa Barbara, 2006.

[39] D. J. Aldous. Random walks on finite groups and rapidly mixing Markov chains. In Seminaire de Probabilites XVII, pages 243-297. 1983. Lecture Notes in Math. 986.

[40] V. Arnau, S. Mars, and I. Marin. Iterative cluster analysis of protein interaction data. Bioinformatics, 21(3):364-378, 2005.

[41] S. Asthana, O. D. King, F. D. Gibbons, and F. P. Roth. Predicting protein complex membership using probabilistic network reliability. Genome Research, 14:1170-1175, May 2004.

[42] G. D. Bader and C. W. V. Hogue. An automated method for finding molecular complexes in large protein interaction networks. BMC Bioinformatics, 4(2), 2003.

[43] J. S. Bader. Greedily building protein networks with confidence. Bioinformatics, 19(15):1869-1874, 2003.

[44] P. M. Bowers, M. Pellegrini, M. J. Thompson, J. Fierro, T. O. Yeates, and D. Eisenberg. Prolinks: a database of protein functional linkages derived from coevolution. Genome Biology, 5(5):R35, 2004.

[45] S. Brin and L. Page. The anatomy of a large-scale hypertextual Web search engine. Computer Networks and ISDN Systems, 30:107-117, 1998.

[46] T. Can, O. C amo.glu, and A. K. Singh. Analysis of protein-protein interaction networks using random walks. In Proceedings of the 5th ACM SIGKDD Workshop on Data Mining in Bioinformatics, Chicago, August 2005.

[47] M. A. Collart. Global control of gene expression in yeast by the Ccr4-Not complex. Gene, 313:1-16, 2003.

[48] G. M. D. Corso. Estimating an eigenvector by the power method with a random start. SIAM J. Matrix Anal. Appl., 18(4):913-937, 1997.

[49] A. C. Gavin, M. Bosche, R. Krause, P. Grandi, M. Marzioch, A. Bauer, J. Schultz, J. M. Rick, A. M. Michon, and C. M. Cruciat. Functional organization of the yeast proteome by systematic analysis of protein complexes. Nature, 415: 141-147, 2002.

[50] Y. Ho, A. Gruhler, A. Heilbut, G. D. Bader, L. Moore, S. L. Adams, A. Millar, P. Taylor, K. Bennett, and K. Boutilier. Systematic identification of protein complexes in saccharomyces cerevisiae by mass spectrometry. Nature, 415: 180-183, 2002.

[51] H. Hu, X. Yan, Y. Huang, J. Han, and X. J. Zhou. Mining coherent dense subgraphs across massive biological networks for functional discovery. Bioinformatics, 21(Suppl. 1):i213-i221, 2005.

[52] T. Ito, T. Chiba, R. Ozawa, M. Yoshida, M. Hattori, and Y. Sakaki. A comprehensive two-hybrid analysis to explore the yeast protein interactome. Proc. Natl. Acad. Sci., 98:4569-4574, 2001.

[53] R. Jansen, H. Yu, D. Greenbaum, Y. Kluger, N. J. Krogan, S. Chung, A. Emili, M. Snyder, J. F. Greenblatt, and M. Gerstein. A bayesian networks approach for predicting protein-protein interactions from genomic data. Science, 302:449-453, October 2003.

[54] G. R. G. Lanckriet, M. Deng, N. Cristianini, M. I. Jordan, and W. S. Noble. Kernel-based data fusion and its application to protein function prediction in yeast. In Proceedings of PSB, 2004.

[55] E. Larschan and F. Winston. The *Saccharomyces cerevisiae* Srb8-Srb11 complex functions with the SAGA complex during Gal4-activated transcription. Mol Cell Biol, 25(1):114-123, 2005.

[56] I. Lee, S. V. Date, A. T. Adai, and E. M. Marcotte. A probabilistic functional network of yeast genes. Science, 306:1555-1558, November 2004.

[57] S. Letovsky and S. Kasif. Predicting protein function from protein/protein interaction data: a probabilistic approach. Bioinformatics, 19:i197-i204, 2003.

[58] L. Lovasz. Random walks on graphs: A survey. Combinatorics, Paul Erdos is Eighty, 2:353-398, 1996.

[59] V. Maytal-Kivity, R. Piran, E. Pick, K. Hofmann, and M. H. Glickman. COPS signalosome components play a role in the mating pheromone response of *S. cerevisiae*. EMBO reports, 3(12):1215-1221, 2002.

[60] H. W. Mewes, C. Amid, R. Arnold, D. Frishman, U. Guldener, G. Mannhaupt, M. Munsterkotter, P. Pagel, N. Strack, V. Stumpfien, J. Warfsmann, and A. Ruepp. MIPS: analysis and annotation of proteins from whole genomes. Nucleic Acids Research, 32:D41-D44, 2004.

[61] A. Y. Ng, A. X. Zheng, and M. I. Jordan. Link analysis, eigenvectors, and stability. In International Joint Conference on Artificial Intelligence (IJCAI), 2001.

[62] C. J. Roberts et al. Signaling and circuitry of multiple MAPK pathways revealed by a matrix of global gene expression profiles. Science, 287:873-880, 2000.

[63] D. Scholtens, M. Vidal, and R. Gentleman. Local modeling of global interactome networks. Bioinformatics, 21(17):3548-3557, 2005.

[64] H.-J. Schuller. Transcriptional control of nonfermentative metabolism in the yeast Saccharomyces cerevisiae. Curr Genet, 43:139-160, 2003.

[65] J. Scott, T. Ideker, R. M. Karp, and R. Sharan. Efficient algorithms for detecting signaling pathways in protein interaction networks. In Proceedings of RECOMB, 2005.

[66] K. Tsuda and W. S. Noble. Learning kernels from biological networks by maximizing entropy. Bioinformatics, 20(S1):i326-i333, 2004.

[67] P. Uetz, G. Cagney, T. A. Mansfield, R. Judson, J. R. Knight, D. Lockshon, V. Narayan, M. Srinivasan, and P. Pochart. A comprehensive analysis of protein-protein interactions in saccharomyces cerevisiae. Nature, 403:623-627, 2000.

[68] C. von Mering, L. J. Jensen, B. Snel, S. D. Hooper, M. Krupp, M. Foglierini, N. Jouffre, M. A. Huynen, and P. Bork. STRING: known and predicted protein-protein associations, integrated and transferred across organisms. Nucleic Acids Research, 33:D433-D437, 2005.

[69] C. von Mering, R. Krause, B. Snel, M. Cornell, S. G. Oliver, S. Fields, and P. Bork. Comparative assessment of large-scale data sets of protein-protein interactions. Nature, 417:399-403, May 2002.

[70] J. Weston, A. Elisseeff, D. Zhou, C. S. Leslie, and W. S. Noble. Protein ranking: From local to global structure in the protein similarity network. Proc. Natl. Acad. Sci., 101: 6559-6563, 2004.

[71] P. Y. Wu et al. Molecular architecture of the S. cerevisiae SAGA complex. Mol Cell, 15(2):199-208, 2004.

[72] Y. Yamanishi, J.-P. Vert, and M. Kanehisa. Protein network inference from multiple genomic data: a supervised approach. Bioinformatics, 20(S1):i363-i370, 2004.

H Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining a significance of frequent subgraphs in a database graph comprising:
    (a) selecting one or more vertices or edges of a database graph as features using, as criteria for the selection, a frequency that a vertex or edge occurs in the database graph, a size of a vertex or edge in the database graph, a structural overlap between vertices or edges in the database graph, or a co-occurrence of vertices or edges in the database graph;
    (b) transforming the selected features into feature vectors, wherein each feature vector comprises a frequency of the selected features in the database graph;
    (c) evaluating the feature vectors by modeling a probability that the selected features occur in a random one of the feature vectors; and
    (d) determining a statistical significance of the feature vectors based on the evaluating step (c), by computing a probability of occurrence of the feature vectors in a random one of the features vector based on the modeled probability, and then obtaining a probability distribution on support of the features vector in a database of random vectors using the probability of occurrence.

2. The method of claim 1, wherein the selecting step (a) is based on one or more of the following:
    a frequency that a vertex or edge occurs in the database graph;
    a size of a vertex or edge in the database graph;
    a structural overlap between vertices or edges in the database graph; and
    a co-occurrence of vertices or edges in the database graph.

3. The method of claim 1, wherein the evaluating step (c) comprises modeling a probability that the selected features occur in a random vector through statistical observations.

4. The method of claim 3, wherein the random vector is constrained by a size of the random vector.

5. The method of claim 1, wherein:
    the evaluating step (c) comprises exploring closed sub-vectors of the feature vectors, wherein said exploring step comprises evaluating sets of closed vectors in a defined order and pruning duplicate sets; and
    the determining step (d) comprises evaluating the statistical significance of each closed sub-vector that is not within a pruned duplicate set.

6. A computer-implemented apparatus for determining a significance of frequent subgraphs in a database graph comprising:
    at least one or more computer systems configured to perform the steps of:
    (a) selecting one or more vertices or edges of a database graph as features using, as criteria for the selection, a frequency that a vertex or edge occurs in the database graph, a size of a vertex or edge in the database graph, a structural overlap between vertices or edges in the database graph, or a co-occurrence of vertices or edges in the database graph;
    (b) transforming the selected features into feature vectors, wherein each feature vector comprises a frequency of the selected feature in the database graph;
    (c) evaluating the feature vectors by modeling a probability that the selected features occur in a random one of the feature vectors; and
    (d) determining a statistical significance of the feature vectors based on the evaluating step (c), by computing a probability of occurrence of the feature vectors in a random one of the features vector based on the modeled probability, and then obtaining a probability distribution on support of the features vector in a database of random vectors using the probability of occurrence.

7. The apparatus of claim 6, wherein the means for selecting (a) is based on one or more of the following:
    a frequency that a vertex or edge occurs in the database graph;
    a size of a vertex or edge in the database graph;
    a structural overlap between vertices or edges in the database graph; and
    a co-occurrence of vertices or edges in the database graph.

8. The apparatus of claim 6, wherein the means for evaluating (c) comprises means for modeling a probability that the selected features occur in a random vector through statistical observations.

9. The apparatus of claim 8, wherein the random vector is constrained by a size of the random vector.

10. The apparatus of claim 6, wherein:
    the means for evaluating (c) comprises means for exploring closed sub-vectors of the feature vectors, wherein said means for exploring comprises evaluating sets of closed vectors in a defined order and pruning duplicate sets; and
    the means for determining (d) comprises means for evaluating the statistical significance of each closed sub-vector that is not within a pruned duplicate set.

* * * * *